(12) United States Patent
Siomina et al.

(10) Patent No.: US 9,924,381 B2
(45) Date of Patent: Mar. 20, 2018

(54) ENHANCING UPLINK MEASUREMENTS FOR POSITIONING BY ADAPTIVELY USING MULTI-ANTENNA SYSTEMS

(71) Applicant: Telefonaktiebolaget L M Ericsson (publ), Stockholm (SE)

(72) Inventors: Iana Siomina, Täby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 14/420,389

(22) PCT Filed: May 3, 2013

(86) PCT No.: PCT/SE2013/050496
§ 371 (c)(1),
(2) Date: Feb. 9, 2015

(87) PCT Pub. No.: WO2014/027941
PCT Pub. Date: Feb. 20, 2014

(65) Prior Publication Data
US 2015/0215793 A1 Jul. 30, 2015

Related U.S. Application Data

(60) Provisional application No. 61/682,568, filed on Aug. 13, 2012.

(51) Int. Cl.
*H04W 24/02* (2009.01)
*H04W 64/00* (2009.01)
(Continued)

(52) U.S. Cl.
CPC ............ *H04W 24/02* (2013.01); *G01S 5/0205* (2013.01); *G01S 5/12* (2013.01); *H04W 64/00* (2013.01)

(58) Field of Classification Search
CPC ........ G01S 5/0205; G01S 5/12; H04W 24/02; H04W 64/00
See application file for complete search history.

(56) References Cited

U.S. PATENT DOCUMENTS

| | | | |
|---|---|---|---|
| 2012/0020320 A1 | 1/2012 | Issakov et al. | |
| 2013/0102342 A1* | 4/2013 | Tesanovic | H04B 7/0623 455/507 |
| 2014/0044205 A1* | 2/2014 | Kim | H04B 7/0404 375/260 |

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 11)", 3GPP TS 36.214 V11.1.0, Dec. 2012, 1-14.
(Continued)

*Primary Examiner* — Kashif Siddiqui
(74) *Attorney, Agent, or Firm* — Patent Portfolio Builders, PLLC

(57) ABSTRACT

Techniques and devices for improving uplink positioning techniques are described. An example method, implemented in a first node in a wireless communications network, begins with obtaining multi-antenna configuration information or multi-antenna capability data, or both, for a second node in the wireless communications network. The node carrying out the node may be a radio base station, a measuring node, or a wireless device to be positioned, in various embodiments. In some embodiments, the second node is a measuring node. In others, the second node is the wireless device to be positioned. The method continues with adapting a multi-antenna configuration of the wireless device for one or more transmissions to be measured for positioning purposes, or adapting a multi-antenna configuration of the measuring node for one or more positioning measurements, or both. The adapting is based on the obtained multi-antenna con- (Continued)

figuration information or multi-antenna capability data, or both.

13 Claims, 7 Drawing Sheets

(51) Int. Cl.
G01S 5/02 (2010.01)
G01S 5/12 (2006.01)

(56) References Cited

OTHER PUBLICATIONS

3GPP, "3rd Generation Partnership Project; Technical Specification Group Radio Access Network; Physical layer procedures (FDD) (Release 11)", 3GPP TS 25.214 V11.5.0, Feb. 2013, 1-127.
Unknown, Author, "[Draft] LS response on UL positioning parameters", Ericsson, TruePosition, Andrew Corp., 3GPP TSG-RAN WG1 Meeting #68bis, R1-121798, Jeju Island, Korea, Mar. 26-30, 2012, 1-2.
Unknown, Author, "Network Based Positioning Support—Change Request", TruePosition, 3GPP TSG-RAN WG2 Meeting #78, R2-122116, Prague, Czech Republic, May 21-25, 2012, 1-17.
Unknown, Author, "UTDOA positioning L1 parameters", TruePosition, 3GPP TSG RAN WG1 Meeting #68bis, R1-121035, Jeju, Korea, Mar. 26-30, 2012, 1-4.
EP Office Action in application No. 13724424.0 dated May 26, 2017, 5 pages.

* cited by examiner

ENHANCING UPLINK MEASUREMENTS FOR POSITIONING BY ADAPTIVELY USING MULTI-ANTENNA SYSTEMS

TECHNICAL FIELD

The present disclosure relates generally to wireless communication networks and in particular to networks and devices performing positioning of devices based on measurements of uplink transmissions.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environments.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments.

Complementary positioning methods may also be provided by a wireless network to augment GPS technology. In addition to mobile terminal-based GNSS (including GPS), the following methods are currently available or will be soon be included in the Long-Term Evolution (LTE) standards developed by the 3$^{rd}$-Generation Partnership Project (3GPP):
  Cell ID (CID),
  E-CID, including network-based angle-of-arrival (AoA),
  Assisted-GNSS (A-GNSS), including Assisted-GPS (A-GPS), based on satellite signals,
  Observed Time Difference of Arrival (OTDOA),
  Uplink Time Difference of Arrival (UTDOA)—currently being standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' locations may also be used to enhance AECID, hybrid positioning, etc.

Positioning Architecture

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," in 3GPP terminology for an end-user wireless station), a radio base station (or "eNodeB," in LTE systems), etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is used for downlink positioning.

LTE Positioning Protocol Annex (LPPa), sometimes referred to as LTE Positioning Protocol A, is a protocol between the eNodeB and the E-SMLC, and is specified only for control-plane positioning procedures, although it still can assist user-plane positioning by querying eNodeBs for information. For example, LPPa can be used to retrieve information such as positioning reference symbol (PRS) configuration in a cell for OTDOA positioning, or UE sounding reference signal (SRS) configuration for UTDOA positioning, and/or eNodeB measurements. LPPa may be used for downlink positioning and uplink positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120a is integrated into eNodeB 110, while LMU 120b shares some equipment, e.g., at least antennas, with eNodeB 110. LMU 120c, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing LPPa or to similar protocols.

In particular, a new interface between the E-SMLC and LMU is being standardized for uplink positioning. This interface, known as SLm, is terminated between a positioning server, e.g., the E-SMLC 140 pictured in FIG. 1, and an LMU. It is used to transport messages according to the SLmAP protocol, a new protocol being specified for UL positioning, between the E-SMLC and the LMU. SLmAP can be used to provide assistance data to an LMU, as discussed in further detail below. This protocol may also be used by the LMU to report to the E-SMLC results of measurements on radio signals performed by the LMU. The SLmAP protocol was previously referred to as the LMUp protocol; thus it should be understood that references herein to SLmAP are referring to a developing protocol referred to as LMUp elsewhere, and vice versa.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. The specific contents of the assistance data to be provided to LMUs by a positioning node are currently being discussed. It has been proposed that the same parameters should be signaled from the eNodeB to a positioning node.

TABLE 1

| Parameter Category | Parameters |
| --- | --- |
| General | C-RNTI |
| | Serving eNB eCGI, PCI |
| | UL-EARFCN |
| | Cyclic prefix Config |
| | UL-Bandwidth |
| SRS | Bandwidth |
| | Sub-frame configuration |
| | Frequency domain position |
| | Cyclic shift |
| | Duration |

TABLE 1-continued

| Parameter Category | Parameters |
| --- | --- |
| | Transmission comb |
| | Configuration index |
| | MaxUpPts |

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

FIG. 2 illustrates the current architecture under discussion in 3GPP for downlink (DL) positioning, again including nodes found in the Radio Access Network (RAN) and the core network, as well as an external LCS Client. It will be appreciated that this architecture includes many of the same components found in the UL positioning architecture illustrated in FIG. 1. Two additional components shown in FIG. 2, however, are the Serving Gateway (S-GVV) and the Packet Data Network Gateway (PDN GW, or P-GW). These gateways terminate the UE's interfaces towards the E-UTRAN network and the Packet Data Network (PDN), respectively.

LPP is currently used for downlink positioning. An LPP message may also include an LPP extension packet data unit (EPDU); Open Mobile Alliance (OMA) LPP Extensions, defined as LPPe, take advantage of this possibility. Currently, LPP and LPPe are used mainly for downlink positioning, while LPPa may be used both for DL and UL positioning.

Positioning Results

A positioning result is a result of processing of obtained measurements, including Cell IDs, power levels, received radio signal strengths or quality, etc. The positioning result is often based on radio measurements (e.g., timing measurements such as timing advance and RTT or power-based measurements such as received signal strength) received from measuring radio nodes (e.g., UE or eNodeB or LMU).

The positioning result may be exchanged among nodes in one of several pre-defined formats. The signaled positioning result is represented in a pre-defined format, e.g., corresponding to one of the seven Universal Geographical Area Description (GAD) shapes. Currently, a positioning result may be signaled between:

an LCS target, e.g., a UE, and an LCS server, e.g., over LPP protocol;

two positioning nodes, e.g., an E-SMLC or SLP, e.g., over a proprietary interface;

a positioning server (such as an E-SMLC,) and other network nodes, e.g., a Mobility Management Entity (MME), a Mobile Switching Center (MSC), a Gateway Mobile Location Center (GMLC), an Operations and Maintenance (O&M) node, a Self-Organizing Network (SON) node, and/or a Minimization of Drive Tests (MDT) node;

a positioning node and an LCS Client, e.g., between an E-SMLC and a Public Safety Access Point (PSAP), or between an SLP and an External LCS Client, or between an E-SMLC and a UE.

Note that in emergency positioning, the LCS Client may reside in a PSAP.

Uplink Positioning Measurements

As the name suggests, measurements for uplink positioning (e.g., UTDOA) are performed on uplink transmissions, which may comprise, e.g., one or more of physical signal or channel transmissions, e.g., reference signal transmissions, random access channel transmissions, Physical Uplink Control Channel (PUCCH) transmissions, or data channel transmissions. Some examples of reference signals transmitted in LTE UL are SRS and demodulation reference signals.

UL Relative Time of Arrival (RTOA) is a currently standardized UTDOA timing measurement. The measurement may be performed on Sounding Reference Signals (SRS), which may be configured for periodic transmissions, typically comprising multiple transmissions but may also be one transmission. SRS transmissions may be triggered by any of the two trigger types:

Trigger type 0: higher layer signaling from eNodeB,
Trigger type 1: via downlink control channel signaling (DCI formats 0/4/1A for FDD and TDD and DCI formats 2B/2C for TDD).

Other example uplink measurements are the uplink measurements specified in 3GPP TS 36.214. These measurements include measurements of received signal strength, received signal quality, angle-of-arrival (AoA), eNodeB receive-to-transmit (Rx-Tx) timing, relative time-of-arrival (RTOA), and other other measurements performed by radio network nodes (e.g., eNodeB or LMU). Other known measurements are UL TDOA, UL TOA, UL propagation delay, etc.

Multi-Antenna Systems

Multiple-input multiple-output (MIMO) technologies are a range of advanced antenna techniques used to improve the spectral efficiency and thereby boost the overall system capacity. MIMO implies that both the base station and the UE ("user equipment"—3GPP terminology for an end user's wireless device, mobile terminal, mobile station, etc.) employ multiple antennas, although the term is sometimes used in a manner that includes scenarios in which only one end of the radio link uses multiple antennas. MIMO techniques are widely studied and applied in practice for downlink communications, i.e., from the base station to the mobile terminal, and are increasingly under consideration for uplink communications as well, i.e., from the mobile terminal to the base station.

There exist a variety of MIMO techniques or modes, including Per Antenna Rate Control (PARC), selective PARC (S-PARC), transmit diversity, receiver diversity, Double Transmit Antenna Array (D-TxAA), etc. The last of these, D-TxAA, is an advanced version of transmit diversity, which is already used in the Wideband-CDMA (WCDMA) networks developed by members of the 3rd-Generation Partnership Project (3GPP).

Irrespective of the particular MIMO technique under discussion, the notation (M×N) is generally used to represent MIMO configuration in terms of the number of transmit (M) and receive antennas (N). Common MIMO configurations used or currently discussed for various technologies are: (2×1), (1×2), (2×2), (4×2), (8×2) and (8×4). The configurations represented by (2×1) and (1×2) are special cases of MIMO, corresponding to techniques known as transmit diversity and receiver diversity, respectively. The configuration (2×2) will be used in systems that support Release 7 of the 3GPP's specifications for WCDMA. In particular, WCDMA FDD release 7 will support double transmit antenna array (D-TxAA) in the downlink, which is a multiple-input multiple-output (MIMO) technique to enhance system capacity. (See 3GPP TS 25.214, "Physical Layer Procedures (FDD)".)

The E-UTRAN ("Evolved Universal Terrestrial Radio Access Network," the air interface of 3GPP's Long Term Evolution (LTE) upgrade path for mobile networks, will support several MIMO schemes, including single-user MIMO (SU-MIMO), in which several spatially multiplexed transmission layers are targeted to or received from a single user terminal, and multi-user MIMO (MU-MIMO), in which each of several spatially multiplexed downlink layers are targeted to different user terminals. MIMO technology has also been widely adopted in other wireless communication standards, such as the IEEE802.16 standards for wireless broadband communications, often referred to as "WiMAX."

The above-mentioned MIMO modes or other MIMO techniques enable spatial processing of the transmitted and received signals. In general, the spatial diversity provided by these techniques can be used to improve spectral efficiency, extend cell coverage, enhance user data rate, mitigate multi-user interference, etc. However, in practice each MIMO technique provides its own benefits. For instance, receiver diversity (1×2) particularly improves signal coverage. On the other hand (2×2) MIMO, such as D-TxAA, leads to increased peak user bit rate.

Ideally, a 2×2 MIMO scheme may double the data rate. Whether the data rate can actually be doubled in practice depends on whether the spatial channels between the transmitter and receiver are sufficiently uncorrelated, so that the rank of the 2×2 MIMO channel matrix is two. (The rank is the number of independent rows or columns of the matrix.) In general, the average data rate will be lower than two times the data rate achieved in single link conditions.

So far, MIMO techniques have generally been used only for downlink transmission (i.e., from base stations to mobile terminals), and have not been widely employed for uplink communications. The reason is that MIMO techniques may involve higher levels of complexity both in the transmitter and in the receiver, compared to single-input, single-output (SISO) type of transmissions. In the radio-frequency (RF) portion of a mobile terminal, for example, several power amplifiers may be needed for the transmitter, depending on the MIMO scheme and on the number transmit antennas. In the receiver, multiple antennas are necessary, and multiple RF chains may be needed, depending on the MIMO schemes. Moreover, each MIMO scheme introduces an additional complexity in the baseband processing.

The use of multiple power amplifiers is a feasible approach in base stations, particularly macro base stations, because the base station has fewer constrains on form factor and battery life. While these constraints are more important for smaller base stations and radio access points, they may still be less restrictive than for a mobile implementation. However, if MIMO is to be used in uplink transmission, care should be taken in the design of (possibly multiple) power amplifiers, and on battery life. MIMO in uplink will have an impact on the battery life, power consumption, form factor and complexity; hence, it is important to exploit as much as possible the benefits that these techniques can provide.

As in the downlink, different possible multi-antenna techniques can be applied in the uplink. Examples include beam-forming and antenna switching. Depending on whether the receiving eNodeB is equipped with multiple receiving antennas, transmit-diversity (2 transmit antennas, 1 receiving antenna) or Uplink-MIMO (2×2) may be candidates for use. Moreover, possible schemes include open loop or closed loop techniques. Open loop multi-antenna techniques are based on the assumption that the UE does not have information about the uplink channel; hence it cannot exploit this knowledge in order to optimize the transmission weights (i.e., the transmission beam-forming) in order to steer the beam in the direction of the base station. In contrast, in the case of closed loop multi-antenna techniques, the UE has some information about the uplink channel which it can exploit for optimizing the beam-forming vector.

Uplink Transmit Diversity

Uplink transmit diversity is also a special type of uplink multi-antenna transmission. Recently, 3GPP has started work on uplink transmit diversity for Release 11 of the specifications for UTRA systems and on uplink MIMO for Release 11 of the specifications for E-UTRA systems. In the future, the extension of the transmit diversity scheme to more evolved uplink MIMO schemes will be defined for UTRA as well as for E-UTRA.

Conventionally, a UE includes only a single uplink transmit antenna, which is used for all types of uplink transmission. However, high-end UEs may have and use multiple uplink transmit antennas for uplink transmission. This is commonly referred to as uplink transmit diversity. The objective of transmit diversity transmission is to achieve higher uplink data rate and lower UE transmission power by virtue of spatial, angular and temporal diversities.

The most common uplink transmit diversity is based on the use of two uplink transmit antennas. The signals from two or more uplink transmit diversity antennas may be transmitted in different manners in terms of their phases, amplitudes, power levels, etc. This gives rise to different uplink transmit diversity schemes. Some well-known schemes are:

Transmit beam-forming open-loop
Transmit beam-forming closed-loop
Switched-antenna uplink transmit diversity open-loop
Switched-antenna uplink transmit diversity closed-loop
Space-time transmit diversity It should be noted that transmit diversity can be regarded as a special case of the MIMO transmission scheme, which can also be used in the uplink. Hence, the embodiments described herein for uplink transmit diversity can be extended or applied to any MIMO scheme, and vice-versa.

In any MIMO or transmit diversity scheme, a set of parameters related to MIMO or uplink transmit diversity are regularly adjusted by the UE. The objective is to ensure that the uplink transmission incorporates the desired spatial, temporal or angular diversities. This in turn improves uplink coverage, reduces interference, increases uplink bit rate and enables UE to lower its transmitted power.

The MIMO or transmit diversity parameters may comprise: relative phase, relative amplitude, relative power, relative frequency, timing, absolute or total power of signals transmitted on transmit diversity branches, etc. The adjustment of all or a sub-set of these parameters is fundamental to a transmit beam-forming scheme.

The objective of beam-forming is to direct the uplink transmission or beam towards the desired base station, which is generally the serving base station, although it may also be another radio network node, e.g., a cooperating eNodeB in a CoMP deployment. This allows the serving base station to decode the received signal more easily. Furthermore, high directivity of the beam towards the desired base station reduces the interference towards the neighboring base stations. Similarly, in the case of switched-antenna transmit diversity, transmit diversity parameter implies the selection of the most appropriate transmit antenna (e.g. in terms of radio condition) out of the available transmit diversity branches. By virtue of using the most appropriate antenna for the uplink transmission, the UE can either reduce its power while retaining a given uplink information rate, or increase the information rate while retaining a given output power.

In open-loop MIMO or transmit diversity schemes, the UE autonomously adjusts the uplink transmit diversity parameters without the use of any network transmitted control signaling or commands. These schemes are simpler, although they may not show substantial gain in all scenarios.

On the other hand, in closed-loop MIMO or transmit diversity schemes, the UE adjusts the uplink transmit diversity parameters by making use of a suitable network-transmitted control signaling or commands. These commands or control signaling reflect the uplink quality, e.g., the quality measured at the base station. These commands are signaled to the UE over the downlink. Furthermore, the commands can be sent exclusively to the UE to enable it to adjust the uplink transmit diversity parameters. Alternatively the UE can utilize any existing commands or signaling that are originally intended for other purposes, for deriving the uplink transmit diversity parameters. Examples of implicit signaling or commands are transmit power control (TPC) commands and HARQ ACK/NACK, etc., which are sent to the UE by the base station for uplink power control and uplink HARQ retransmission scheme respectively. The closed-loop schemes have a potential of leading to a larger performance gain than open-loop schemes, due to the use of network control parameters signaled for adjusting the uplink transmit diversity parameters.

MIMO or any transmit diversity scheme can be used in any technology including LTE, WCDMA or GSM. For instance in LTE, the switched antenna uplink transmit diversity is standardized in LTE release 8.

UE and Base Station MIMO Capabilities

Support for uplink and/or downlink MIMO is generally a so-called "UE capability," since it leads to significantly better performance compared to the baseline scenario (single transmit and receive antenna). Therefore, for UEs supporting MIMO, such capability may be communicated to the network at the time of call setup or doing registration process. In some cases, a network configuration may support more than one MIMO mode. In one scenario, a particular base station may support all possible MIMO modes allowed by the corresponding standard. In another scenario the base station may offer only a sub-set of MIMO modes. In a basic arrangement, a base station may not offer any MIMO operation, i.e., it supports only single transmit antenna. Therefore, the actual use of a particular MIMO technique is possible in scenarios where both the serving base station and UE bear the same MIMO capability.

Uplink and/or downlink MIMO can also work in conjunction with multi-carrier. The MIMO with multi-carrier is a different type of UE capability reported to the network.

Multi-Carrier or Carrier Aggregation

To enhance peak rates within a technology, so-called multi-carrier or carrier aggregation solutions are known. Each carrier in multi-carrier or carrier aggregation system is generally termed as a component carrier, or sometimes referred to as a cell. In simple terms, the component carrier is an individual carrier in a multi-carrier system. The term carrier aggregation is also referred to with the terms (e.g., interchangeably called) "multi-carrier system", "multi-cell operation", "multi-carrier operation", "multi-carrier" transmission and/or reception. Carrier aggregation is used for transmission of signaling and data in the uplink and downlink directions. One of the component carriers is the primary component carrier (PCC) or simply primary carrier or even anchor carrier. The remaining ones are called secondary component carriers (SCCs) or simply secondary carriers or even supplementary carriers. Generally the primary or anchor component carrier carries the essential UE specific signaling. The primary component carrier exists in both uplink and downlink direction in carrier aggregation. The network may assign different primary carriers to different UEs operating in the same sector or cell.

With carrier aggregation, the UE has more than one serving cell in downlink and/or in the uplink: one primary serving cell and one or more secondary serving cells operating on the PCC and SCCs respectively. The serving cell is interchangeably called the primary cell (PCell) or primary serving cell (PSC). Similarly, the secondary serving cell is interchangeably called the secondary cell (SCell) or secondary serving cell (SSC). Regardless of the terminology, the PCell and SCell(s) enable the UE to receive and/or transmit data. More specifically the PCell and SCell exist in downlink and uplink for the reception and transmission of data by the UE. The remaining non-serving cells are called neighbor cells.

Component carriers belonging to the CA may belong to the same frequency band (intra-band carrier aggregation) or to different frequency bands (inter-band carrier aggregation) or any combination thereof (e.g., two component carriers in band A and one component carrier in band B). Furthermore, the component carriers in intra-band carrier aggregation may be adjacent or non-adjacent in the frequency domain (intra-band, non-adjacent carrier aggregation). A hybrid carrier aggregation comprising any two of intra-band adjacent, intra-band non-adjacent and inter-band aggregations is also possible. Using carrier aggregation between carriers of different technologies is also referred to as "multi-RAT carrier aggregation" or "multi-RAT-multi-carrier system" or simply "inter-RAT carrier aggregation". For example, carriers from WCDMA and LTE may be aggregated. Another example is the aggregation of carriers from LTE Frequency-Division Duplex (FDD) and LTE Time-Division Duplexing (TDD) modes, which may also be interchangeably called as multi-duplex carrier aggregation system. Yet another example is the aggregation of LTE and CDMA2000 carriers. For the sake of clarity, carrier aggregation within the same technology as described can be regarded as 'intra-RAT' or simply 'single RAT' carrier aggregation.

The component carriers in carrier aggregation may or may not be co-located in the same site or radio network node (e.g., a radio base station, relay, mobile relay, etc.). For instance, the component carriers may originate at different locations (e.g., from non-co-located base stations, or from base stations and a remote radio head (RRH), or at remote radio units (RRUs)). Well-known examples of combined carrier aggregation and multi-point communication techniques include the Distributed Antenna System (DAS), the Remote Radio Head (RRH), the Remote Radio Unit (RRU), and Coordinated Multipoint (COMP) transmission. The techniques described herein also apply to multi-point carrier aggregation systems as well as to multi-point systems without carrier aggregation. The multi-carrier operation may also be used in conjunction with multi-antenna transmission. For example signals on each component carrier may be transmitted by the eNodeB to the UE over two or more antennas.

A general problem with current uplink positioning techniques is that the positioning measurements and techniques are defined with respect to single-antenna transmissions. Accordingly, improved techniques for uplink positioning techniques are needed.

SUMMARY

Several techniques and devices for improving uplink positioning techniques are described below. More particularly, techniques for exploiting multi-antenna capabilities of wireless devices and measuring nodes are disclosed, allowing for more accurate and more reliable positioning of the wireless devices. These techniques and devices include, but are not limited to:

Methods in a radio node for performing a positioning measurement on at least signals transmitted by a wireless device, several of which methods comprise:
  adapting the radio node's receive antenna configuration to be able to receive signals transmitted by the wireless device, wherein the device is capable of using or is using multiple antennas for the purpose of positioning measurement;
  performing a positioning measurement by using the adapted configuration; and
  in some embodiments, signaling the supported antenna configurations and/or the adapted (optimized or preferred) configuration to another node Methods in a wireless device capable of transmitting signals using one, two or more antennas for use by a measuring node for performing at least one positioning measurement, several of which methods comprise:
  adapting its multi-antenna transmitter configuration enabling the receiver of the measuring node to receive signals transmitted by the wireless device using the adapted configuration; and
  transmitting a signal for positioning measurement by using the adapted antenna configuration.

Methods in a positioning node of enabling positioning of a wireless device, several of which methods comprise:
  sending a request to a wireless device for the wireless device node's capability related to multi-antenna transmission or a request to adapt its transmit antenna configuration for transmitting signals used for positioning measurement by a measuring node in order to align with a pre-defined or an indicated configuration; and/or
  sending a request to a measuring node for the measuring node's capability related to multi-antenna transmission or a request to adapt its receive antenna configuration for receiving signals used for positioning measurement by the said measuring node in order to align with a pre-defined or an indicated configuration; and/or
  sending a request to a network node serving or controlling a wireless device, for the wireless device node's capability related to multi-antenna transmission or a request to adapt the transmit antenna configuration of the said wireless device for transmitting signals used for positioning measurement by a measuring node in order in order to align with a pre-defined or an indicated configuration; and
  receiving at least one uplink measurement from a measuring node, wherein said measurement is performed on signals transmitted using the adapted antenna configuration and/or received using the adapted antenna configuration.

It will be appreciated that two or more of the methods summarized above and described in detail below can be combined. Other embodiments of the present techniques, also described in detail below, include radio nodes, network nodes, and other devices configured to carry out one or several of the methods summarized above.

An example method according to several embodiments of the present invention, implemented in a first node in a wireless communications network, begins with obtaining multi-antenna configuration information or multi-antenna capability data, or both, for a second node in the wireless communications network, i.e., for a node other than the node carrying out the method. The node carrying out the node may be a radio base station, a measuring node, or a wireless device to be positioned, in various embodiments. In some embodiments, the second node is a measuring node. In others, the second node is the wireless device to be positioned.

The method continues with adapting a multi-antenna configuration of the wireless device for one or more transmissions to be measured for positioning purposes, or adapting a multi-antenna configuration of the measuring node for one or more positioning measurements, or both. The adapting is based on the obtained multi-antenna configuration information or multi-antenna capability data, or both.

In some embodiments, the method involves adapting a multi-antenna configuration and specifically includes selecting a multi-antenna configuration, e.g., one of several possible supported multi-antenna configurations. In some embodiments, the obtained information is multi-antenna capability data that indicates at least one of: a capability of using a particular multi-antenna configuration; a capability of dynamically activating or deactivating one or more antennas; a capability of determining a multi-antenna configuration; and a capability of adapting multi-antenna configuration.

In some embodiments, the adapting of a multi-antenna configuration of the wireless device or of the multi-antenna configuration of the measuring node is followed by the performing of at least one radio signal transmission or at least one radio measurement, based on the adapted multi-antenna configuration. In some embodiments, the adapted configuration is sent to another node in the wireless network.

Several different types of nodes may be configured to carry out the methods summarized above. In some embodiments, for example, the first node is a radio base station not involved in data communication with the wireless device. In other embodiments, the first node is a radio base station node controlling the wireless device to be positioned. In some of these embodiments, the radio base station node adapts a multi-antenna configuration of the wireless device by selecting at least one of a multi-antenna technique and a transmit antenna configuration, to be used by the wireless device for one or more transmissions to be measured, for positioning purposes, at one or more measuring nodes.

In other embodiments, the first node is the wireless device to be positioned and the second node is a measuring node. In some of these embodiments, the wireless device adapts its own multi-antenna configuration, based on a multi-antenna configuration of the measuring node, by selecting at least one of a multi-antenna technique and a transmit antenna configuration, for one or more transmissions to be measured, for positioning purposes, at the measuring node. The multi-antenna technique in these and in other embodiments may comprise at least one of: a transmit diversity scheme, a receive diversity scheme, a beam-forming scheme, an uplink multiple-input multiple-output (MIMO) technique, an open-loop multi-antenna technique, and a closed-loop multi-antenna technique.

In still other embodiments, the first node is a measuring node and the second node is the wireless device to be positioned. In some of these methods, a receive antenna configuration of the measuring node for one or more measurements and/or a multi-antenna technique are adapted. In yet other embodiments, the first node is a positioning node. In some of these embodiments, the positioning node suggests a multi-antenna technique or transmit configuration to another node. This may comprise, for example, suggesting a multi-antenna technique or transmit configuration for the wireless device, to the wireless device or to a radio node controlling the wireless device. It may also or instead comprise, for example, suggesting, to a measuring node, a multi-antenna technique or receive antenna configuration for the measuring node.

Various methods corresponding to the embodiments summarized above are illustrated in the attached drawings and described in detail in the following discussion. Corresponding apparatus adapted to carry out one or more of these methods, and variants thereof, are also detailed. Of course, the present invention is not limited to the above-summarized methods, apparatus, features, and advantages. Indeed, those skilled in the art will recognize additional features and advantages upon reading the following detailed description, and upon viewing the accompanying drawings.

DETAILED DESCRIPTION

Figure 1:
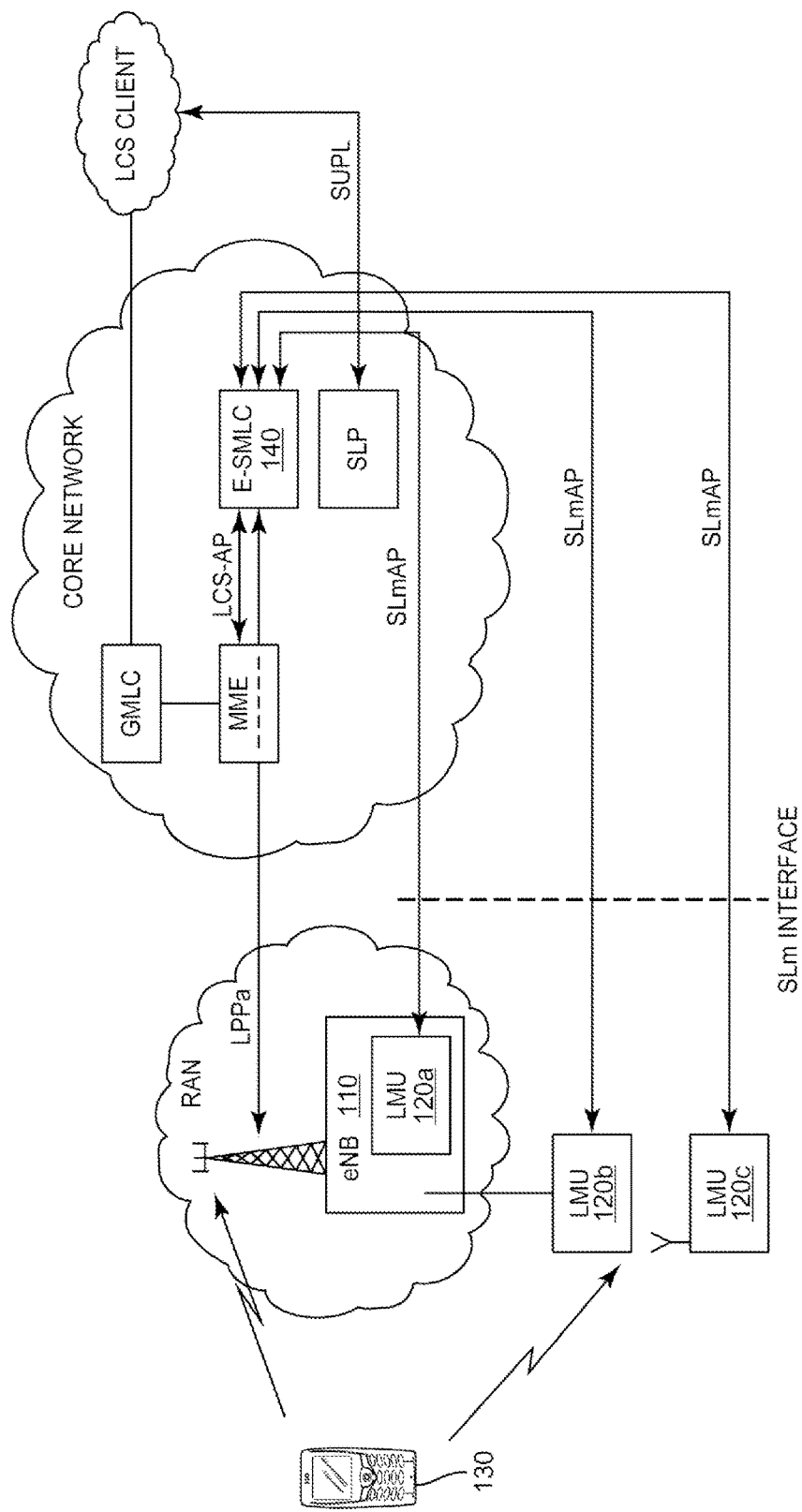
FIG. 1 illustrates several nodes in an example network configured according to the LTE positioning architecture for uplink positioning.

While terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi-RAT context. Some other RAT examples are LTE-Advanced, UMTS, HSPA, GSM, cdma2000, WiMAX, and WiFi.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," and LMUs, may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (for example, a dual-mode user equipment may operate with any one or combination of WiFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell, e.g., characterized by a cell ID but not providing a full cell-like service, associated with a transmit node.

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

A "measuring node" is a radio node performing positioning measurements, and may be a wireless device or a radio network node (e.g., an LMU or eNodeB). Downlink measurements are typically measurements performed by a wireless device on at least signals/channels transmitted by one radio network node. Uplink measurements are typically measurements performed by a radio network node on at least signals/channels transmitted by one or more wireless devices. There are also measurements that include both uplink and downlink measurement components, e.g., Rx-Tx or RTT. In some uplink measurements, typically, the measurement is performed by a radio network node on signals/channels transmitted by wireless device as well as by the network node itself. Some examples of uplink positioning measurements, or radio measurements that may be used for positioning, are timing measurements (e.g., TDOA, TOA, timing advance Type 1 and timing advance Type 2, RTT measured by a radio network node, UL RTOA defined for UTDOA, UL propagation delay, etc.), angle measurements (e.g., AoA), received signal strength and received signal quality measurements. Some of these measurements are defined in 3GPP TS 36.214, the latest version of which may be found at www.3gpp.org. Uplink measurements may also include measurements that have at least one uplink measurement component, e.g., the uplink measurement component of a two-directional measurement.

The term "coordinating node" as used herein is a network and/or node that coordinates radio resources among one or more radio nodes. Examples of a coordinating node are a network monitoring and configuration node, an OSS node, an O&M node, an MDT node, a SON node, a positioning node, an MME, a gateway node such as Packet Data Network Gateway (P-GVV) or Serving Gateway (S-GVV) network node or femto gateway node, a macro node coordinating smaller radio nodes associated with it, an eNodeB coordinating resources with other eNodeBs, etc.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The term "subframe" as used in the description herein (typically related to LTE) is an example resource in the time domain, and in general it may be any pre-defined time instance or time period.

The technical embodiments described herein are described primarily in the context of uplink (UL) positioning, i.e., positioning techniques based on measurements of uplink transmissions. The most typical example of such a positioning method is UTDOA, but the techniques described herein may be applied to other UL positioning approaches as well. UL measurements may be timing measurements (e.g., time of arrival, UE Rx-Tx, eNodeB Rx-Tx, RTT, propagation delay, time-difference of arrival) or power-based measurements (e.g., received signal strength or received signal quality).

The embodiments described herein are not limited to LTE, but may apply to any Radio Access Network (RAN), single- or multi-RAT. Some other RAT examples are LTE TDD, LTE-Advanced, UMTS, HSPA, GSM, cdma2000, WiMAX, and WiFi.

The term multi-antenna system herein generally refers to a system capable of using more than one transmit antenna and/or more than one receive antenna. However, the adapted configuration may comprise in some examples only one transmitter and one receiver, based on a certain adaptation criteria. Such a system may also use any advanced antenna technology, e.g., any MIMO scheme, any transmit diversity scheme, any receive diversity scheme, beam-forming, vertical beam-forming (e.g., by adjusting antenna elements' tilts), etc.

The techniques and devices described herein apply to multi-point antenna deployments (e.g. CoMP, DAS, heterogeneous deployments with RRUs, RRH, multi-point transmission and/or reception systems), which generally refers to a system using more than one transmit antenna and/or more than one receive antenna, where at least two transmit antennas and/or at least two receive antennas associated with the same node are non-collocated. Multi-antenna techniques may be used in systems with multi-point antenna deployments. The techniques described herein can also apply to carrier aggregation systems and multi-point carrier aggregation systems.

As noted above, a general problem with current uplink positioning techniques is that the positioning measurements and techniques are defined with respect to single-antenna transmissions. Accordingly, improved techniques for uplink positioning techniques are needed.

At least the following problems may be envisioned with current approaches:

The positioning node selecting measuring node and requesting/configuring UL measurements is not aware of multi-antenna related capabilities of the transmitting and measuring nodes and does not take into account the current multi-antenna configuration of the nodes either.

The measuring node performing positioning measurements on signals transmitted by a wireless device using multi-antennas is not aware of the latter and thus does not take into account the antenna configuration of the device.

Positioning measurement accuracy will be degraded and in the worst case positioning may fail in case the receiver of the measuring node is not compatible with the transmit antenna configuration of the wireless device.

In short, positioning measurements performed on uplink signals sent by the UE are defined assuming single transmit antenna. However uplink multi-antenna techniques have now been introduced and are under continuing development. According to the present standards and techniques, the measuring node may not be aware of the UE transmit antenna configuration. The positioning measurements on uplink signals when multiple antennas are used may fail, or their performance will be degraded.

Several of the techniques and devices described below address these problems. These techniques and devices include, but are not limited to:

Methods in a radio node for performing a positioning measurement on at least signals transmitted by a wireless device, several of which methods comprise:
  Adapting the radio node's receive antenna configuration to be able to receive signals transmitted by the wireless device, wherein the device is capable of using or is using multiple antennas for the purpose of positioning measurement;
  Performing a positioning measurement by using the adapted configuration; and
  In some embodiments, signaling the supported antenna configurations and/or the adapted (optimized or preferred) configuration to another node Methods in a wireless device capable of transmitting signals using one, two or more antennas for use by a measuring node for performing at least one positioning measurement, several of which methods comprise:
  Adapting its multi-antenna transmitter configuration enabling the receiver of the measuring node to receive signals transmitted by the wireless device using the adapted configuration; and
  Transmitting a signal for positioning measurement by using the adapted antenna configuration.

Methods in a positioning node of enabling positioning of a wireless device, several of which methods comprise:
  Sending a request to a wireless device for the wireless device node's capability related to multi-antenna transmission or a request to adapt its transmit antenna configuration for transmitting signals used for positioning measurement by a measuring node in order to align with a pre-defined or an indicated configuration; and/or
  Sending a request to a measuring node for the measuring node's capability related to multi-antenna transmission or a request to adapt its receive antenna configuration for receiving signals used for positioning measurement by the said measuring node in order to align with a pre-defined or an indicated configuration; and/or
  Sending a request to a network node serving or controlling a wireless device, for the wireless device node's capability related to multi-antenna transmission or a request to adapt the transmit antenna configuration of the said wireless device for transmitting signals used for positioning measurement by a measuring node in order in order to align with a pre-defined or an indicated configuration; and
  Receiving at least one UL measurement from a measuring node, wherein said measurement is performed on signals transmitted using the adapted antenna configuration and/or received using the adapted antenna configuration.

It will be appreciated that two or more of the methods summarized above and described in detail below can be combined. Other embodiments of the present techniques, also described in detail below, include radio nodes, network nodes, and other devices configured to carry out one or several of the methods summarized above.

In the discussion that follows, several techniques for assisting positioning measurements are described, as might be implemented in any of several nodes in a wireless communication system. For purposes of discussion, two categories of these techniques, labeled "Solution Category 1" and "Solution Category 2", are described below. However, it should be appreciated that these categories of techniques are closely related, and any of the specific embodiments described in either category may be combined with each other, in various embodiments. Likewise, variations of specific embodiments described below may be applied in similar ways to other embodiments.

Solution Category 1—Adapting Antenna Configuration for UL Positioning Measurements According to several embodiments of the techniques described in this section, a node performs adaption of the antenna configuration for performing radio measurements for positioning on uplink radio signals. The uplink radio signal may comprise a physical signal or a channel transmission that may be used for positioning measurements; some examples of the uplink radio signals are reference signals transmitted in uplink (e.g., SRS or demodulation reference signals in LTE), random access channel (e.g., PRACH in LTE), uplink control channel (e.g., PUCCH in LTE), and a data channel (e.g., PUSCH in LTE). The uplink radio signal may be configured and used specifically for positioning or may also be used for other purposes while being measured for positioning (e.g., for data transmissions). Currently, uplink positioning in LTE may be performed only on SRS but e.g. in UTRA it is possible to perform measurements also on channels used for voice communication.

Positioning methods based on uplink radio measurements may be uplink positioning (e.g., UTDOA), hybrid positioning, E-CID positioning, AECID positioning, pattern matching, RF fingerprinting, etc.

The node performing the adaptation may be any one or more of:
- a radio node transmitting radio signals (e.g., wireless device), e.g.,
  - the radio node may adapt the transmit antenna configuration,
- a radio node controlling or coordinating radio signal transmission by the radio node transmitting the radio signals (e.g., serving eNodeB), e.g.,
  - the radio node may adaptively select the multi-antenna technique while accounting for positioning measurements to be performed,
  - the radio node may adapt the transmit antenna configuration,
  - the radio node may adapt the receive antenna configuration,
- a measuring radio node (e.g., LMU, a non-serving eNodeB performing measurements for positioning purpose on radio signals transmitted in uplink, any eNodeB performing positioning measurements using positioning-specific antenna or positioning-specific antenna configuration, or a serving eNodeB performing adaptation of the antenna in a non-serving cell for performing positioning measurements), e.g.,
  - the measuring radio node may adapt the multi-antenna technique for positioning measurements
  - the measuring node may adapt the receive antenna configuration
- a positioning node (e.g., E-SMLC in LTE), e.g.,
  - the positioning node may suggest to the transmitting radio node, configuring/controlling/serving radio node, or a measuring node any one or more of: multi-antenna technique, transmit configuration, and receive antenna configuration for positioning purpose which may be optimized to improve hearability (coverage) of uplink radio signals and/or take into account capabilities of the measuring radio nodes.

The antenna configuration that is adapted may comprise, for example, any one or more of:
- a multi-antenna technique,
- a transmit antenna configuration, and
- a receive antenna configuration.

A multi-antenna technique may comprise, e.g., any advanced antenna technology such as one or a set of MIMO schemes, any transmit diversity scheme (e.g., space-time transmit diversity, switched antenna uplink transmit antenna diversity open/closed loop, beam-forming open/closed loop), any receive diversity scheme, a beam-forming scheme, etc. In one example, at least some of the parameters of transmit and/or receive antenna configuration may also be used in or associated with a multi-antenna scheme (e.g., 2×2, 1×4 or 4×4 MIMO). In another example, at least some signal transmission configuration (e.g., absolute or relative phase or phase shift, absolute or relative amplitude, absolute or relative power, relative frequency, timing, absolute or total power of signals transmitted on transmit diversity branches) may also be used in or associated with a multi-antenna scheme.

A transmit antenna configuration may comprise, e.g.:
- a transmit antenna type (e.g., omni or directional or narrow-beam directional),
- an antenna pattern,
- a number of transmit antennas or transmit antenna ports,
- a set of transmit antennas to be used for uplink radio signal transmissions for positioning measurements,
- an antenna spacing,
- an antenna polarization,
- antenna or antenna elements parameters (e.g., tilt, azimuth, height),
- a transmitter beam configuration (e.g., beam width, beam tilt, beam pattern in a multi-beam configuration),
- a transmission power or power weights associated with transmit antennas, transmit antenna elements, or multi-antenna branches or streams,
- a maximum absolute or relative transmit power allowed per transmit antenna, antenna element or a branch,
- a transmit power backoff (e.g., a maximum power reduction (MPR), A-MPR, etc.) associated with a multi-antenna capable transmitter or a certain multi-antenna scheme,
- a transport format of multi-antenna signal, e.g.,
  - allowed modulation scheme e.g. QPSK only, QPSK and 16 QAM, any modulation up to 64 QAM, etc.
- a number of streams of signals transmitted by multi-antenna, e.g., each stream is generated by at least 2 antennas,
- a reference signal specific to multi-antenna transmission, e.g., SRS, sounding pilot or channel, etc.,
- information related to carrier on which multi-antenna transmission can occur, e.g.,
  - information related to frequency band, EARFCN etc of carrier on which multi-antenna is used,
  - number of carriers in multi-carrier operation on which multi-antenna is used,
  - system bandwidth (e.g., channel bandwidth or transmission bandwidth) and/or reference signal bandwidth over which signal can be transmitted using multi-antenna system and/or received using multi-antenna system.

A receive antenna configuration may comprise, e.g.:
- a receive antenna type (e.g., omni or directional or narrow-beam directional),
- a receiver type on which a signal transmitted by a multi-antenna system can be received e.g. interference rejection and combining receiver, interference cancellation receiver, etc.
- an antenna pattern,
- a number of receive antennas, receive antenna ports, branches or streams,
- a set of receive antennas to be used for receiving uplink radio signal transmissions for positioning measurements,
- a receive antenna spacing,
- a receive antenna polarization,
- a receive antenna or antenna elements parameters (e.g., tilt, azimuth, height),
- a receiver beam configuration (e.g., beam width, beam tilt, beam pattern in a multi-beam configuration),
- weights associated with receive antennas, receive antenna elements, branches, or streams,
- a transport format of multi-antenna signal that can be received, e.g.,
  - a modulation type of signal transmitted by multi-antenna that can be received by the receiver. In one example it can be QPSK. In another example it can be QPSK, 16 QAM and 64 QAM, etc.

a number of transmitted streams of signals that can be received by the receiver, information related to carrier for receiving multi-antenna transmission from transmitting wireless device, e.g., information related to frequency band, EARFCN, etc., of carrier on which multi-antenna configuration is used, a number of carriers in multi-carrier operation on which multi-antenna is used, a system bandwidth (e.g., a channel bandwidth or transmission bandwidth) and/or reference signal bandwidth over which a signal transmitted using multi-antenna by a wireless device can be received by the receiver.

Antenna configuration adaptation as referred to herein may comprise, e.g., selecting or optimizing antenna configuration (e.g., any one or more of: multi-antenna technique, transmit antenna configuration, and receive antenna configuration, or any parameters associated with them) for uplink measurements performed for positioning purpose.

The term multi-antenna system as used herein generally refers to a system capable of using more than one transmit antenna and/or more than one receive antenna. However, the adapted configuration may utilize, in some examples, only one transmitter and one receiver, based on a certain adaptation criteria, such as when it is determined that both the transmitting node and the measuring node do not support multi-antenna configuration in general or for positioning purpose specifically, while, for example, some other transmitting nodes and/or measuring nodes comprised in the same network are capable of using multi-antenna techniques. A 1×1 configuration may also configured when 2-tx and 2-rx are supported by the transmitting and measuring node, respectively, but it may be optimal with respect to a certain criteria (e.g., channel characteristics). In this 1×1 configuration case, the adaptation may further comprise selecting a specific transmit and/or receive antenna port (e.g., with a certain port ID or port index), based on a certain adaptation criteria.

Some examples of the purpose of performing the adaptation are:

matching with the measuring node's and/or transmitting node's capability, ensuring signal coverage or a certain transmit power (e.g. boosting) per transmit antenna port used for uplink signals measured for positioning, controlling power consumption, controlling bandwidth (e.g., a larger bandwidth for signals transmitted from one antenna port may be configured than when two or more antenna ports are used), controlling a transport format e.g. selecting less robust modulation type (e.g. 64 QAM) if both transmitter and receiver support them, interference coordination and/or interference handling (e.g., rejection, cancellation, exploiting radio channel diversity, etc.).

The adaptation may be performed by the corresponding node, e.g., by a pre-defined rule (e.g., a using a pre-defined configuration for a certain positioning method or in certain conditions e.g. related to coverage), In one example, one or two multi-antenna schemes may be pre-defined (e.g., by a requirement) or pre-configured (in at least one node) for a specific uplink signal (e.g., SRS), a specific positioning method (e.g., UTDOA), and/or RAT, autonomously, e.g., based on collected performance statistics, historical data, or performed measurements, based on a request, indication or instruction received from another node In one example, the other node (e.g., positioning node) may indicate one antenna configuration (e.g., used by the transmitting wireless device), In another example, the other node (e.g., a positioning node) may indicate more than one antenna configurations from which an adapted antenna configuration may be selected (e.g., the provided set of configurations may be a set of supported and/or preferred and/or adapted for certain conditions by another node), e.g., in one example, the indication may be sent to eNodeB serving a wireless device and the set of provided configurations may be associated with one or more measuring nodes, or, in another example, the indication may be sent to a measuring node and the set of provided configurations may be associated with one or more wireless devices.

The adaptation may be configured statically (e.g., when pre-defined), semi-statically, or dynamically. The adaptation may be performed per receiving or measuring node and/or per transmitting node (e.g., a certain configuration or configuration pattern with some common characteristics for all UEs in a certain cell). The adaptation may be performed once per uplink measurement, for each uplink transmission instance, once during a time unit (e.g., symbol, subframe, radio frame), after a certain time period expires, upon a triggering event or condition indicating that the adapted configuration may need to or has to change; it may be performed periodically or aperiodically (e.g., for semi-persistent scheduling or when the uplink signals are transmitted periodically), according to a schedule (the schedule may be comprised in a time-domain pattern), for all or some occasions when uplink signal transmission intended for positioning occurs.

The adapted configuration may be saved. The saved configuration may be used for statistics or may be applied by a measuring and/or transmitting node more than once. The saved adapted configuration may be used or remain valid during a certain time interval, until a certain time period expires or a triggering event or a triggering condition occurs indicating that the adapted configuration may need to or has to change; the saved configuration may be applied periodically (e.g., for semi-persistent scheduling or when the uplink signals are transmitted periodically) or aperiodically, according to a certain schedule (the schedule may be comprised in a time-domain pattern), and/or for all or some occasions when uplink signal transmission intended for positioning occurs during the positioning session or during the entire uplink measurement.

When the uplink measurement is based on more than uplink signal transmissions transmitted non-continuously in time (e.g., every $5^{th}$ subframe), the adapted configuration may be used for all uplink transmissions of that wireless device or only for uplink transmissions intended for positioning (e.g., SRS signals configured for positioning purpose).

The adapted configuration may be the applied configuration or a recommended or preferred configuration. The adaptation may be implemented by means of configuring one or more antennas, e.g., via Radio Resource Control (RRC) signaling, or by means of activating/deactivating configured antennas e.g., via a Medium Access Control (MAC) command.

The adaptation may concern antennas used for uplink transmissions for positioning measurements and/or for other transmissions (e.g., PUCCH, PRACH or PUCCH) during uplink positioning measurements (e.g., to maintain a certain quality level of other transmissions during on-going positioning session; some limited degradation on some of the other transmissions may also be acceptable in one example).

The adapted configuration may be used by the adapting node and/or may be signaled to another node, e.g.:
- A transmitting node may provide the adapted configuration to eNodeB or positioning node
- An eNodeB may provide the adapted configuration to the transmitting node (e.g., to a wireless device via a unicast, multicast or broadcast signaling) or a positioning node or measuring node (e.g., when LMU is integrated, co-located or co-sited)
- A positioning node may provide the transmitting node's adapted configuration to a measuring node
- A positioning node may provide the measuring node's adapted configuration to a transmitting node or a node controlling the transmitting node (e.g., serving eNodeB is provided with a recommended or supported configuration of one or more measuring node)
- A measuring node may provide its adapted configuration (e.g., a recommended or supported configuration) to a positioning node (e.g., via a radio interface or a fixed interface such as SLm).

The adaptation may be based on multiple criteria and conditions, e.g.:
- Transmitter and/or receiver capability to use a multi-antenna scheme and/or support for dynamically change the status of configured antennas, e.g. activating/deactivating transmit and/or receive antennas,
  - The adaptation may be based on at least own capability, but may also account for another node's capability (e.g., the transmitter and/or the node controlling the transmitting node may adapt responsively to the multi-antenna related capability of a specific measuring node, a set of closest measuring node, or most of measuring nodes—this information may be provided e.g. by the positioning node; in another example, a measuring node adapts to the transmitting node's capability which may be received via positioning node)
  - In one example, activation/deactivation of UE transmit antennas may be performed via RRC or via MAC command.
  - In another example, activation/deactivation of receive antennas may be performed autonomously by a measuring node, e.g., based on performance statistics, information indicative of signal coverage (e.g., transmit power since low transmit power may imply small coverage) and/or distance to the transmitting node (e.g., long distance may indicate potential coverage issue).
  - In yet another example, activation/deactivation of transmit and/or receive antennas may be used for interference coordination (e.g., to avoid or reduce a negative impact of the near-far problem).
- Multi-antenna configuration used by the transmitting node and/or measuring node(s),
  - The adaptation may be based on own current or preferred configuration, but may also account for another node's current or preferred configuration (e.g., the transmitting node may adapt with respect to one or more measuring nodes; a measuring node may adapt with respect to one or more of transmitting nodes)
- Dynamic adaptation based on the availability and the detail and/or quality level of performance feedback (e.g., closed loop),
- Power consumption or battery level (e.g., selecting multi-antenna techniques reducing power consumption may be considered when the battery level is critical or below a threshold),
- Environment type (e.g., selecting a multi-antenna configuration responsive to the determined or indicated by another node environment type such as indoor/outdoor or dense urban/urban/suburban/rural),
- UE speed (which may be determined by the adapting node or may be received by the adapting node from another node, e.g., a measuring node may receive the speed information from a positioning node or from eNodeB or wireless device via positioning node),
- Spectrum profile and/or channel characteristics (e.g., delay spread, channel variation, Doppler shift, etc.)—multi-antenna system configuration may be adapted to the spectrum profile and/or channel characteristics,
- Interference conditions and presence of aggressor interference, i.e., strong interference from one or more transmissions from one or more interfering nodes—a multi-antenna system configuration may be adapted to one or more interference characteristics, e.g.,
  - total interference and noise level experienced at the receiver;
  - interference variation and interference characteristics (e.g., white or colored noise with a specific pattern pr properties);
  - aggressor signal absolute strength or relative to the measured signal strength wherein the aggressor and/or measured signal characteristics may be described by SNR, Es/Iot, Es/Noc, or similar;
  - number of aggressor signals (e.g., the number of signals with a signal strength above a threshold or within a threshold with respect to the measured signal strength);
  - knowledge about the aggressor signal such as knowledge of the signal sequence, absolute or relative transmit power and/or received signal power, antenna ports used for aggressor signal transmissions, time and/or frequency resources used for aggressor signal transmissions; the amount of overlap of the aggressor signal and measured signal at the measuring node;
    - In one embodiment, the information about one or more (known or expected) aggressor signals may be provided to the measuring node together with the measured signal (e.g., SRS) configuration information to facilitate the adaptation of the multi-antenna configuration at the measuring node.
    - The measuring node may also obtain the aggressor signal interference from an eNodeB, e.g., via proprietary interface when an LMU is integrated into an eNodeB and is suffering from high interference, likely generated by uplink transmissions of the UEs served by this eNodeB.
    - Example 1: when the aggressor signal properties are known and the signal may be reconstructed, interference cancellation may be considered; when interference is from data or unknown signals, interference rejection may be efficiently performed with a multi-antenna configuration.

Example 2: when the aggressor interference is strong (e.g., interference from a UE located closer to the measuring node and transmitting at a higher power level than a UE located further away from the measuring node and transmitting at a lower power level) reducing the number of antenna ports or deactivating certain antenna ports may be considered to increase resource reuse factor in the radio network and hereby reduced the level and/or probability of the aggressor interference.

Feedback availability (e.g., closed loop or similar),

In one embodiment, the adaption of the antenna configuration is performed based on a feedback provided by the measuring node (e.g., LMU), wherein the feedback may comprise e.g. channel quality, radio environment characteristics at the measuring node, channel characteristic (e.g., channel profile, delay spread, amplitude, channel correlation at different antenna ports) at one or more receive antennas of the measuring node, radio signal correlation result, measurement quality, detection probability, statistics for any of the above.

The feedback may be provided periodically, upon a condition (e.g., at least one of the characteristics above is not acceptable, e.g., the measurement quality is below a threshold or the total interference and noise are above a threshold), or upon a request from another node.

The feedback may be provided to the positioning node, to the transmitting node (e.g., via LPP), or to the node controlling/serving the transmitting node (e.g., via proprietary interface when an LMU is integrated into an eNodeB and is suffering from high interference, likely generated by the UEs served by this eNodeB).

Based on the received feedback, the transmitting node may adapt its multi-antenna system configuration to facilitate positioning performance.

Positioning method and/or uplink measurement type(s),

Frequency, frequency band, configured components carrier (CC), e.g.,

Selecting a multi-antenna configuration responsive to the frequency information

In one example, supported frequency of the measuring node may be provided: by the measuring node or a network node (e.g., O&M, SON, LMU gateway, etc.) to a positioning node, by a positioning node to another positioning node or to the transmitting node or to the node controlling the transmitting node (e.g., serving eNodeB)

In another example, the frequency information of the transmitting node may be provided: by the transmitting node or the node controlling the transmitting node to a positioning node, by a positioning node to another positioning node or to a measuring node In yet another example, the same UE may use different multi-antenna configurations in different frequency bands or in different frequencies or depending on whether it is configured with CA or not.

Supported or available system and/or measurement bandwidths, e.g.,

Selecting a multi-antenna configuration responsive to the bandwidth information

In one example, supported bandwidth of the measuring node may be provided: by the measuring node or a network node (e.g., O&M, SON, LMU gateway, etc.) to a positioning node, by a positioning node to another positioning node, by a positioning node to the transmitting node or the node controlling the transmitting node (e.g., serving eNodeB)

In another example, bandwidth information of the transmitting node may be provided: by the transmitting node or the node controlling the transmitting node to a positioning node, by a positioning node to another positioning node or to a measuring node.

Various embodiments of the techniques described may incorporate or be augmented by signaling means for enhancing antenna configuration awareness at different nodes. This signaling, examples of which are described below, may be unicast, multi-cast or broadcast signaling, in various embodiments.

Signaling of data related to multi-antenna scheme configuration

The data related to multi-antenna scheme configuration may comprise an indication of the multi-antenna schemes and/or specific parameters related to antenna configuration currently configured or supported by the node (e.g., see transmit and receive antenna configurations described above)

A node (e.g., a transmitting node, a node controlling the transmitting node such as serving eNodeB or RNC, or a measuring node) may provide to a positioning node the data related to multi-antenna scheme configuration. The positioning node may further use this information, e.g., for any one or more of: (re)selecting positioning method, configuring uplink measurements, signaling this information to another node (e.g., a measuring node), selecting a set of measuring nodes for performing uplink measurements on the uplink signals transmitted from the activated antennas.

A positioning node or a configuring/controlling/serving node associated with the transmitting node may provide to a measuring node the data related to multi-antenna scheme configuration at the transmitting node such as wireless device. The measuring node may use these data, e.g., for configuring uplink measurements for positioning.

A positioning node may provide to a transmitting node or a node controlling the transmitting node the data related to multi-antenna scheme configuration to enable antenna configuration adaptation by the transmitting node or by the node controlling the transmitting node when configuring uplink transmissions for uplink positioning measurements.

Signaling of data related to a transmit power scheme associated with a multi-antenna capable transmitter receiver or a specific multi-antenna scheme The data related to a transmit power scheme associated with a multi-antenna capable receiver or a specific multi-antenna scheme (see also data related to multi-antenna scheme configuration) may comprise, e.g., an explicit or implicit indication of a transmit power scheme (e.g., equal transmit power weights among transmitting antennas, a power backoff or MPR, etc.)

The data related to a transmit power scheme associated with a multi-antenna capable transmitter receiver or a specific multi-antenna scheme may be provided to a positioning node, e.g., by a transmitting node or a configuring/controlling node associated with the transmitting node. For example, a positioning node may need to account for the transmit power configuration or for the UE power backoff (aka MPR, A-MPR) due to insertion losses arising from the UE hardware devices in the uplink MIMO transmit chain. MPR is applied by UE even when there is one transmit antenna, since the same diplexer is used for one or all transmit antennas; MPR is pre-defined. A-MPR is signaled to UE by network node depending upon deployment scenario. The positioning node may use this information to calculate pathloss, to select a set of measuring nodes (e.g., accounting for the reduced hearability/coverage due to the power backoff).

The data related to a transmit power scheme associated with a multi-antenna capable transmitter/receiver or a specific multi-antenna scheme may be provided to a measuring node, e.g., by a positioning node or a configuring/controlling node associated with the transmitting node. The measuring node needs to account for the transmit power configuration or UE power backoff in order to configure or optimize its receiver parameters to ensure signal detection.

Signaling of data related to antenna activation/deactivation status

The data related to antenna activation/deactivation status may comprise, e.g.: an indication of the current activation/deactivation status of all antennas, of an indicated subset of antennas, or a pre-defined set of antennas (e.g., antenna 1 and antenna 2, if supported; but not antenna 3 or 4 even if they are supported by one of the transmitting or measuring nodes); a node's capability to temporarily activate/deactivate antennas configured for a multi-antenna scheme A node (e.g., a measuring node, O&M node, or SON node) may provide to a positioning node a measuring node's capability to dynamically adapt to a changed activation/deactivation status of transmitting antennas. In this case, without stopping the measurement, the measuring node may dynamically reconfigure its receiver to receive uplink signals only on activated set of transmit antennas when it receives an update of the activation/deactivation status of at least one antenna of the transmitting node.

A node (e.g., a transmitting node or a node controlling the transmitting node such as serving eNodeB or RNC) provides to a positioning node the information related to activation status of transmit antennas of the transmitting node. The positioning node may further use this information, e.g., for any one or more of: (re)selecting positioning method, configuring uplink measurements, signaling this information to another node (e.g., a measuring node), selecting a set of measuring nodes for performing uplink measurements on the uplink signals transmitted from the activated antennas.

A node (e.g., a transmitting node, a node controlling the transmitting node, and/or positioning node) provides to a measuring node the information related to activation status of transmit antennas of the transmitting node. Based on this information, the measuring node, may e.g. look only for uplink signals on activated antennas and not for the UE signals which are not transmitted by deactivated antennas.

In one example, the activation/deactivation status may be related to an uplink MIMO scheme e.g. closed loop transmit diversity, beamforming, antenna switch diversity, etc.

Solution Category 2—Pre-Defined Rules and Applicability to Requirements and Testing In this section, some rules and pre-defined requirements for ensuring uplink measurement performance are described. As noted above, techniques described in the section above may also apply herein or may be combined with any embodiment described in this section.

According to embodiments in this section, a measuring node may adapt its antenna configuration to meet certain pre-defined requirements, a transmitting node (e.g., a wireless device) may adapt its antenna configuration to meet certain pre-defined requirements, a node controlling/serving the transmitting node (e.g., serving eNodeB) may adapt the transmitting node's configuration to meet certain pre-defined requirements, and/or a network node (e.g., positioning node) may assist (e.g., ensure that the configurations comply with the nodes' capabilities or suggest one or more of the adapted antenna configurations) in adapting transmitting node's antenna configuration and/or measuring node's antenna configuration to meet certain pre-defined requirements. For adapting antenna configuration, any one or a combination of the embodiments described for Solution Category 1 may be used.

For example, it may be required to report said measurements within a certain time and/or with a certain pre-defined measurement accuracy level. Further example requirements that may be associated with the described embodiments may be grouped as follows, e.g.:

requirements for uplink positioning measurements when the adaptation is performed, and/or requirements for uplink positioning measurements when multi-antenna transmissions and/or receptions are used, and/or multi-antenna (e.g. uplink MIMO) general requirements when the adaptation is used for uplink measurements for the positioning purpose (e.g., to ensure that performance of other transmissions such as data transmissions or general-purpose measurements is not degraded or does not fall below a threshold during uplink transmissions for positioning).

In yet another example, a pre-defined measurement requirement (e.g., accuracy requirement or measurement time requirement) related to uplink multi-antenna configuration or capability may have to be met under one or more additional conditions, e.g., any one or more of:

at least a certain number of transmit antennas are used (e.g., configured and/or activated) for uplink transmission, at least a certain number of receive antennas are used (e.g., configured and/or activated) for uplink measurements, the power backoff (e.g. MPR, A-MPR, etc.) on uplink signal due to multi-antenna transmission is below a certain threshold, e.g., 3 dB, the maximum output power per transmit antenna is at least above a threshold, e.g., 17 dBm per antenna, time misalignment between signals transmitted by any two transmit antenna of the wireless device is within a threshold, e.g., ±200 ns, the absolute transmit power difference between signals transmitted by any two transmit antennas of the wireless device is within a threshold, e.g., 6 dB, the configured and/or activated transmit antenna separation characteristic is above a threshold, the configured and/or activated receive antenna separation characteristic is above a threshold, the phase discontinuity of signals transmitted when multiple transmit antenna of the wireless device is used is within a threshold, e.g., ±30 degrees, a channel characteristic has an acceptable level based on a comparison to a reference value (e.g., Doppler shift or speed is below a threshold or a delay spread is below a threshold), the number of antenna (re)configurations changes or associated interruptions does not exceed a certain number (e.g., N=1 or N=2) during the entire measurement or during a time interval or between two consecutive transmit occasions, the number of carrier aggregation configuration updates of the transmitting node does not occur at all or does not occur more than times during the uplink measurement being performed.

When one or more antenna is activated, deactivated, configured or de-configured (i.e., a transmit antenna configuration update) in multi-antenna operation there is a short interruption on uplink transmission of signals transmitted by wireless device. In this case a pre-defined rule is defined to account for interruption while a positioning measurement is being done. For example it may be pre-defined that a measuring node may extend the measurement period of a measurement performed on the signals transmitted using multiple antennas to account for at least the interruption due to transmit antenna configuration update. This is explained by several examples:

In one example the measuring node may extend the measurement period to a pre-defined measurement period applicable to the case when antenna configuration update occurs while measurement is performed.

In yet another example the measuring node may extend the measurement period to a value dependent (e.g. proportional) to the number of times the antenna configuration update is done while the said measurement is performed, e.g., pre-defined measurement period T=number of times antenna configuration update done during measurement+antenna configuration update interruption time multiplied by the number of times when antenna configuration update occurs The antenna configuration update time is the duration required by the UE to activate a deactivated uplink antenna or deactivate an uplink activated antenna or configure or de-configure uplink antennas or uplink antenna scheme, respectively.

The rules related to measurements when antenna configuration update may apply to any type of radio measurements done by a measurement which uses signals used for uplink multi-antenna transmission, i.e., a timing measurement, signal strength measurement, signal quality measurement, etc.

The pre-defined rules, the set of parameters, and/or values of parameters described above may be different, e.g.:

for different interference conditions, for different bandwidth configurations or transmit signal (e.g., SRS) configurations, when different uplink signals are used for performing uplink measurements (e.g., SRS and PUSCH), and/or when a wireless device is configured with CA and without CA, and/or when a measuring node is capable or not of measuring on SCells, and/or when a wireless device is configured with CoMP/multi-flow transmission with or without CA, and/or when the measuring node performs measurements on R1 and R2 carriers concurrently for the same or different UE (e.g., R1=1 and R2>1), and/or for different RATs, and/or for different duplex mode configuration (e.g., for FDD and TDD or for FDD and HD-FDD).

The methods described herein, e.g., the methods of adapting antenna configurations and methods of meeting a pre-defined requirement (e.g., as described above) may also be configured in a test equipment (TE) node (e.g., a system simulator (SS) or test system (TS)). The TE or SS will have to implement all configuration methods related to embodiments applicable to different nodes, e.g., a wireless device, a serving radio node, a positioning node, measuring radio nodes (e.g., standalone LMU), to verify pre-defined requirements and procedures described in preceding sections.

The purpose of the test is to verify that the radio nodes, measuring node, wireless device, positioning node, etc., are compliant to the pre-defined rules, protocols, signaling and requirements associated with adapting antenna configurations of a multi-antenna system.

Typically the TE or SS or TS separately performs tests for UE and radio network nodes. The testing may be measurement-specific and may be capability-dependent. For example, requirements described in preceding section may be verified with such TE or SS.

For UE testing, the TE or SS will also be capable of:

Receiving the measurement results from a measuring node,

Analyzing the received results e.g. comparing the measurement result or the statistics of the measurement results (e.g., with 90% confidence) obtained in the test with the reference results to determine whether measuring device is compliant to the requirements or not. The reference can be based on the pre-defined requirements or UE behavior or theoretical estimate or performed by a reference device. The reference device can be part of TE or SS.

Methods for Assisting Positioning Measurements

In view of the detailed techniques described above, it will be appreciated that FIG. 3 is a process flow diagram that illustrates a generalized method for assisting positioning measurements according to several of the techniques detailed herein. As shown at block 310, the method begins with the obtaining, by a first node, of multi-antenna configuration information or multi-antenna capability data, or both, for a second node in the wireless communications network, i.e., for a node other than the node carrying out the method. As will be shown below, the node carrying out the method may be a radio base station, a measuring node, or a wireless device to be positioned, in various embodiments. In some embodiments, the second node is a measuring node. In others, the second node is the wireless device to be positioned.

As seen at block 320, the method continues with adapting a multi-antenna configuration of the wireless device for one or more transmissions to be measured for positioning purposes, or adapting a multi-antenna configuration of the measuring node for one or more positioning measurements, or both. The adapting is based on the obtained multi-antenna configuration information or multi-antenna capability data, or both.

In some embodiments, the method involves adapting a multi-antenna configuration and specifically includes selecting a multi-antenna configuration, e.g., one of several possible supported multi-antenna configurations.

In some embodiments, the obtained information is multi-antenna capability data that indicates at least one of: a capability of using a particular multi-antenna configuration; a capability of dynamically activating or deactivating one or more antennas; a capability of determining a multi-antenna configuration; and a capability of adapting multi-antenna configuration.

In some embodiments, the adapting of a multi-antenna configuration of the wireless device or of the multi-antenna configuration of the measuring node is followed by the performing of at least one radio signal transmission or at least one radio measurement, based on the adapted multi-antenna configuration. In some embodiments, the adapted configuration is sent to another node in the wireless network. All of these alternatives are shown at block 330. It should be noted that block 330 is outlined with a dashed line, indicating that the operations shown therein are "optional," in that they may not appear in some embodiments or may be carried out by a node other than the node carrying out the operations shown in blocks 310 and 320.

Figure 3:
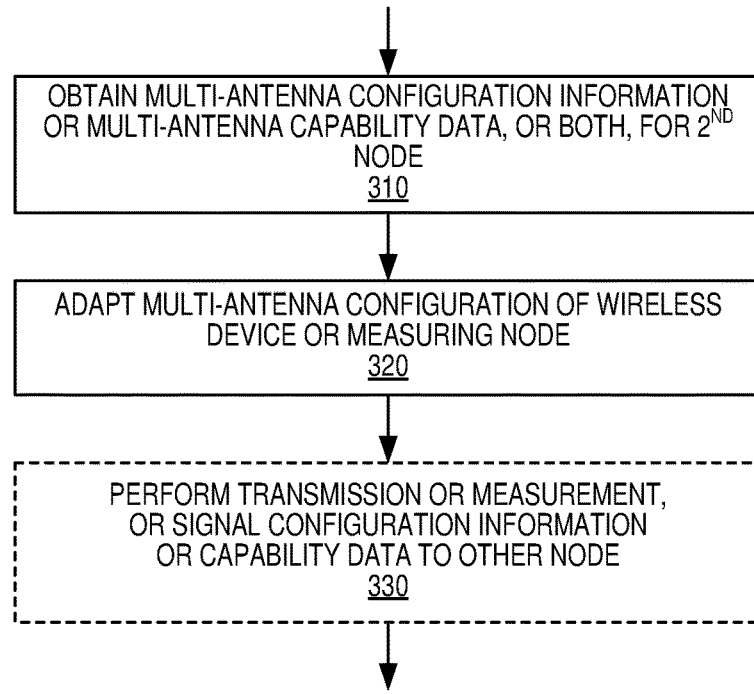
FIGS. 3-8 illustrate example processes for assisting positioning measurements in a wireless communication network.
Figure 4:
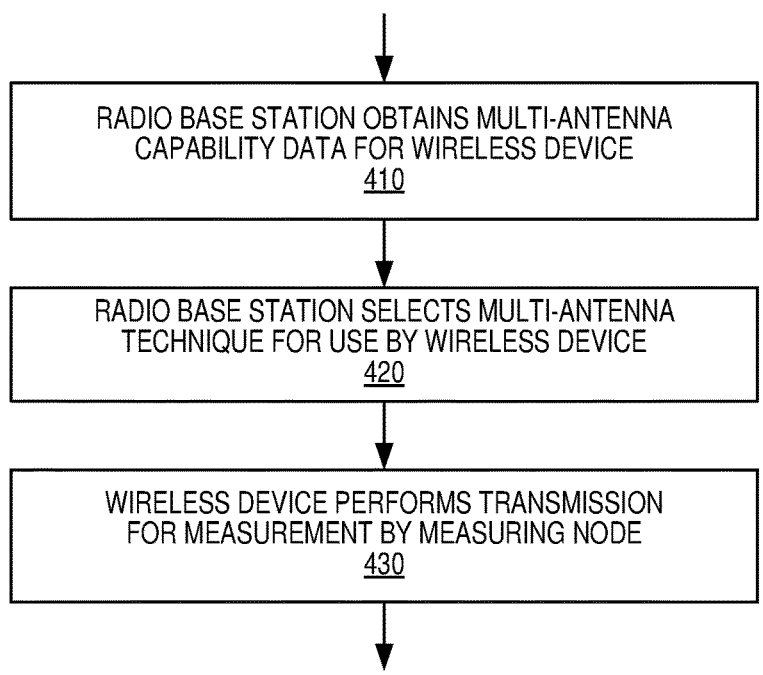
Figure 5:
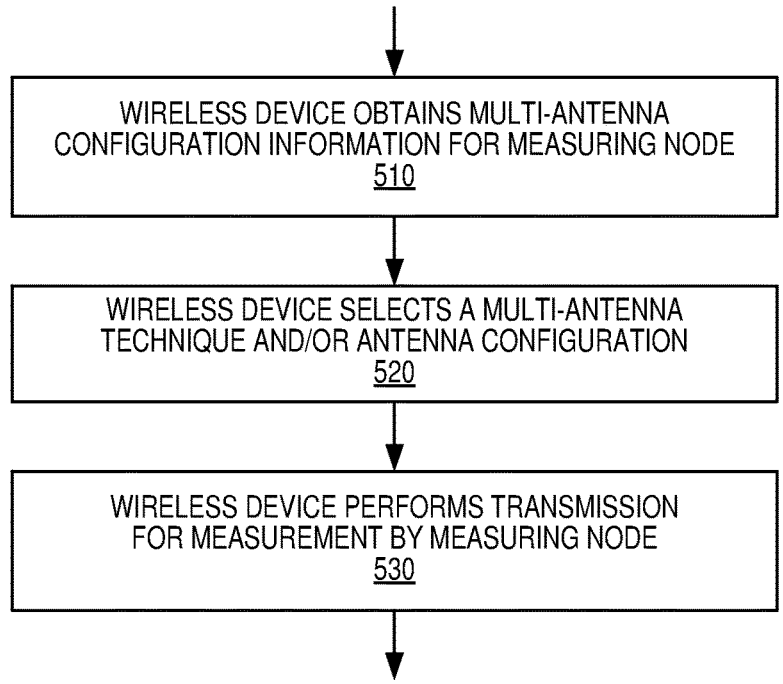
Figure 6:
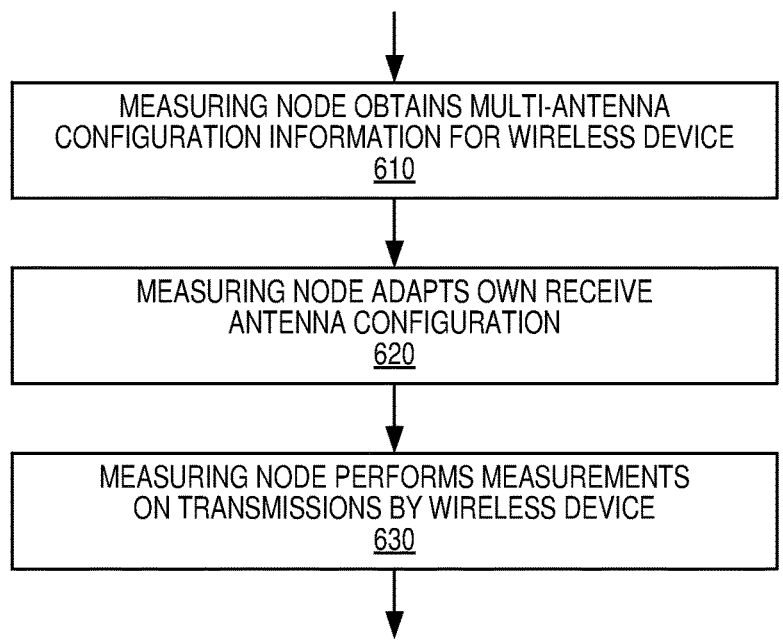

As suggested above, several different types of nodes may be configured to carry out the method illustrated in FIG. 3. Example process flows corresponding to some of these embodiments are shown in FIGS. 4, 5, and 6. It should be understood that these are more specific examples of the general technique illustrated in FIG. 3. It should also be understood that there are other examples that are not shown.

In some embodiments of the method shown in FIG. 3, for example, the first node is a radio base station not involved in data communication with the wireless device. In other embodiments, the first node is a radio node controlling the wireless device to be positioned. One example is shown at FIG. 4, where block 410 illustrates the obtaining, by the radio base station, of multi-antenna configuration information for the wireless device. As shown at block 420, the radio base station adapts a multi-antenna configuration of the wireless device by selecting at least one of a multi-antenna technique and a transmit antenna configuration, to be used by the wireless device for one or more transmissions to be measured, for positioning purposes, at one or more measuring nodes. As shown at block 430, the wireless device subsequently performs at least one transmission for measurement by the measuring node, based on the adapted multi-antenna configuration.

In other embodiments, the first node is the wireless device to be positioned and the second node is a measuring node. An example of this is shown in FIG. 5, where block 510 illustrates the obtaining, by the wireless device, of multi-antenna configuration information for the measuring node. In some of these embodiments, the wireless device adapts its own multi-antenna configuration, based on a multi-antenna configuration of the measuring node, by selecting at least one of a multi-antenna technique and a transmit antenna configuration, for one or more transmissions to be measured, for positioning purposes, at the measuring node. This is shown at block 520. The multi-antenna technique in these and in other embodiments may comprise at least one of: a transmit diversity scheme, a receive diversity scheme, a beam-forming scheme, an uplink multiple-input multiple-output (MIMO) technique, an open-loop multi-antenna technique, and a closed-loop multi-antenna technique. Block 530 illustrates that the wireless device subsequently performs at least one transmission for measurement by the measuring node, based on the adapted multi-antenna configuration.

In still other embodiments, the first node is a measuring node and the second node is the wireless device to be positioned. In some of these methods, a receive antenna configuration of the measuring node for one or more measurements and/or a multi-antenna technique are adapted. A process flow diagram corresponding to some of these embodiments is shown in FIG. 6, where block 610 illustrates the obtaining, by the measuring node, of multi-antenna configuration information for the wireless device, and where block 620 illustrates the adapting of the measuring node's receive antenna configuration. In some cases, the measuring node may receive signaling, from a positioning node, identifying the multi-antenna technique. The measuring node subsequently performs measurements on transmissions by the wireless device, as shown at block 630.

Figure 7:
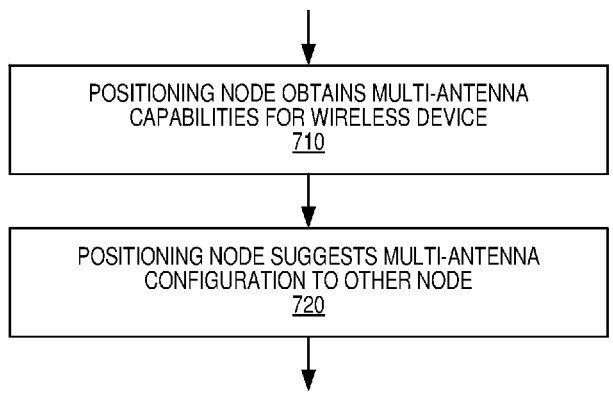

In still other embodiments, the first node is a positioning node. A process flow diagram corresponding to one example of such an embodiment is given by FIG. 7, where block 710 illustrates the obtaining, by the measuring node, of multi-antenna capability data for the wireless device. As shown at block 720, the method further comprises suggesting a multi-antenna technique or transmit configuration to another node. This may comprise, for example, suggesting a multi-antenna technique or transmit configuration for the wireless device, to the wireless device or to a radio node controlling the wireless device. It may also or instead comprise, for example, suggesting, to a measuring node, a multi-antenna technique or receive antenna configuration for the measuring node.

In several embodiments, the adapting of a multi-antenna configuration comprises adapting a transmit antenna configuration. This may be done, in some embodiments, by adapting at least one of: a transmit antenna type; an antenna pattern; a number of transmit antennas or transmit antenna ports; a set of transmit antennas to be used; an antenna spacing; an antenna polarization; one or more antenna orientation parameters; a transmitter beam configuration; a transmission power or power weights associated with transmit antennas, transmit antenna elements, or multi-antenna branches or streams; a number of streams transmitted by multiple antennas; a reference signal specific to multi-antenna transmission; and information specifying a carrier, a number of carriers, a frequency band, or a system combination, or a combination thereof, for a multi-antenna transmission. In some of these embodiments, adapting a transmit antenna configuration comprises adapting at least one of: a maximum absolute power or a maximum relative transmit power allowed per transmit antenna, antenna element, or branch; a transmit power back-off for a multi-antenna transmitter or a multi-antenna scheme; and a transport form of a multi-antenna signal.

In some embodiments, the adapting of a multi-antenna configuration is based on one of the parameters noted above. Thus, for example, adapting a multi-antenna configuration may comprise adapting a transmit antenna configuration based on at least one of: a transmit antenna type; an antenna pattern; a number of transmit antennas or transmit antenna ports; a set of transmit antennas to be used; an antenna spacing; an antenna polarization; one or more antenna orientation parameters; a transmitter beam configuration; a transmission power or power weights associated with transmit antennas, transmit antenna elements, or multi-antenna branches or streams; a number of streams transmitted by multiple antennas; a reference signal specific to multi-antenna transmission; and information specifying a carrier, a number of carriers, a frequency band, or a system combination, or a combination thereof, for a multi-antenna transmission.

In other embodiments, adapting a multi-antenna configuration may comprise adapting a receive antenna configuration. This may be done, for example, by adapting at least one of: a receive antenna type; a receiver type for receiving a multi-antenna transmission; an antenna pattern; a number of receive antennas, receive antenna ports, branches, or streams; a set of receive antennas to be used for receiving transmissions to be measured; a receive antenna spacing; a receive antenna polarization; one or more receive antenna orientation parameters; a receiver beam configuration; weights associated with receive antennas, receive antenna elements, branches, or streams; a number of transmitted streams to be received; and information specifying a carrier, a number of carriers, a frequency band, or a system combination, or a combination thereof, for a multi-antenna transmission. In some embodiments, adapting the receive antenna configuration may comprise selecting a transport format for a multi-antenna signal to be received.

Similarly, adapting a multi-antenna configuration may comprise adapting a receive antenna configuration based on at least one of the parameters noted above, including, but not limited to: a receive antenna type; a receiver type for receiving a multi-antenna transmission; an antenna pattern; a number of receive antennas, receive antenna ports, branches, or streams; a set of receive antennas to be used for receiving transmissions to be measured; a receive antenna spacing; a receive antenna polarization; one or more receive antenna orientation parameters; a receiver beam configuration; weights associated with receive antennas, receive antenna elements, branches, or streams; a number of transmitted streams to be received; and information specifying a carrier, a number of carriers, a frequency band, or a system combination, or a combination thereof, for a multi-antenna transmission.

In any of several of the embodiments described above, obtaining multi-antenna capability data comprises receiving data describing the capabilities from another node in the wireless communications network. In various embodiments, the adapting may be performed by the first node based on a pre-defined rule, autonomously, or based on a request, indication or instruction received from another node. The adapting may be based on one or more pre-defined requirements pertaining to measurements for positioning the wireless device, in some embodiments. In some embodiments, the adapting is further based on one or more of: interference conditions; bandwidth configurations or transmit signal configurations; feedback availability; measurement performance; UE speed; environment type; a type or types of signals used for positioning measurements; whether carrier aggregation is used by the wireless device; a multi-antenna related capability of another node, and a duplex mode configuration for the wireless device or measuring node. Likewise, in some embodiments the adapting is performed so as to achieve at least one of: matching with the measuring node's and/or transmitting node's capability, ensuring signal coverage or a certain transmit power per transmit antenna port used for uplink signals measured for positioning, controlling power consumption, controlling bandwidth, controlling a transport format, and interference coordination and/or interference handling.

Figure 8:
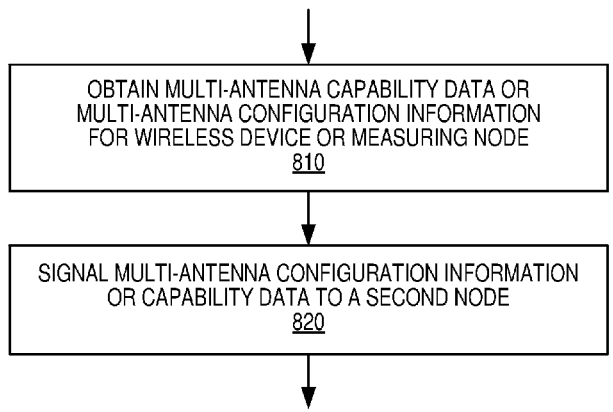

FIG. 8 is a process flow diagram illustrating an example method that is closely related to the methods shown in FIGS. 3-7 and discussed above. The method shown in FIG. 8, which is carried out by a first node in a wireless communications network begins, as shown at block 810, with determining multi-antenna capability data or multi-antenna configuration information, or both, for a measuring node or for a wireless device to be positioned, or both. As shown at block 820, the method continues with signaling the determined multi-antenna capability data or multi-antenna configuration information, or both, to a second node in the wireless communications network. It will be appreciated that the method illustrated in FIG. 8 complements the methods detailed above.

Figure 2:
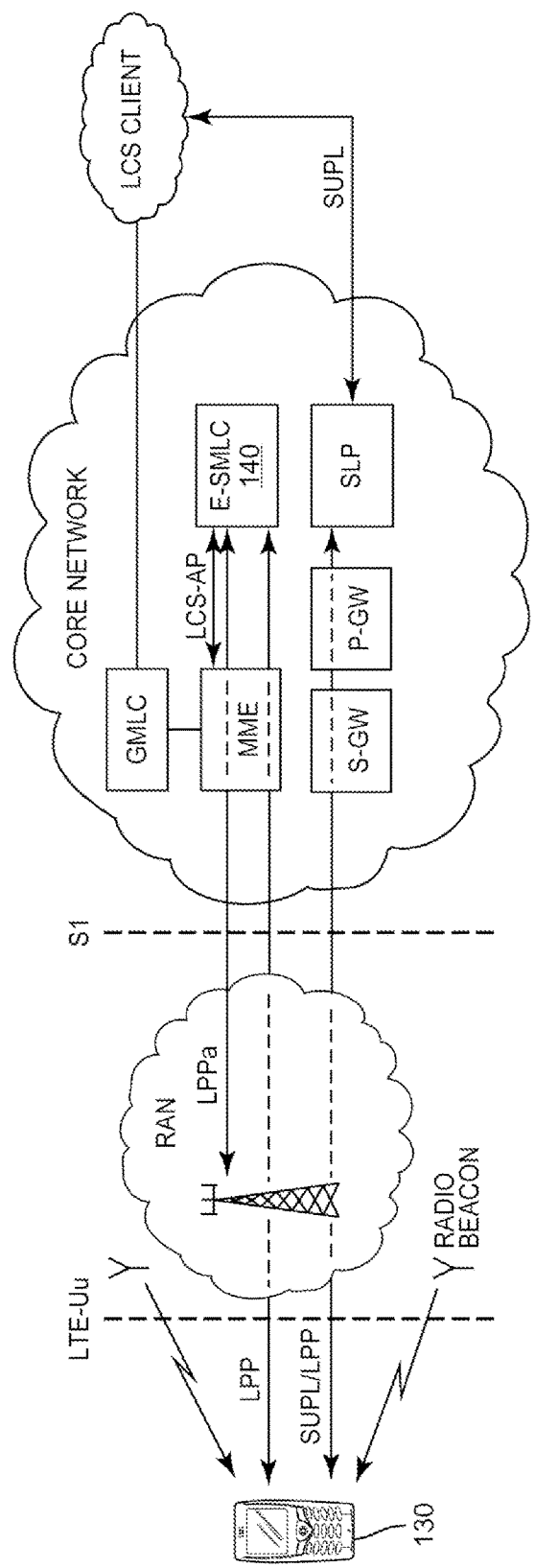
FIG. 2 illustrates several nodes in an example network configured according to the LTE positioning architecture for downlink positioning.

Although the techniques described above may be implemented in any appropriate type of telecommunication system, supporting any suitable communication standards and using any suitable components, particular embodiments of the described solutions may be implemented in an LTE network, such as in any of several of the nodes illustrated in FIGS. 1 and 2. The example network may further include any additional elements suitable to support communication between wireless devices or between a wireless device and another communication device (such as a landline telephone). Although each of the illustrated network nodes in FIGS. 1 and 2 may represent a network communication device that includes any suitable combination of hardware and/or software, these network nodes may, in particular embodiments, represent a device such as the example network node 900 illustrated in FIG. 9. Similarly, although the illustrated base station nodes may represent network nodes that includes any suitable combination of hardware and/or software, these network nodes may, in particular embodiments, represent devices such as the example network node 1000 illustrated in greater detail by FIG. 10.

Figure 9:
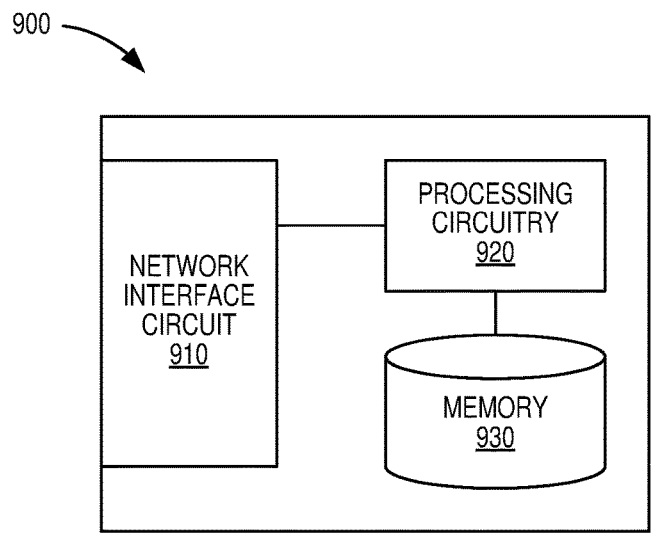
FIG. 9 illustrates an example network node according to several embodiments of the invention.

As shown in FIG. 9, the example network node 900 includes processing circuitry 920, a memory 930, and network interface circuitry 910. In particular embodiments, some or all of the functionality described above as being provided by a network node may be provided by processing circuitry 920, executing instructions stored on a computer-readable medium, such as the memory 930 shown in FIG. 9. Alternative embodiments of the network node 900 may include additional components beyond those shown in FIG. 9 that may be responsible for providing certain aspects of the node's functionality, including any of the functionality described above and/or any functionality necessary to support the solutions described above.

More particularly, embodiments of the present invention include positioning nodes, measuring nodes, and radio base station nodes, each having a configuration generally like that illustrated in FIG. 9, e.g., including a network interface 910 adapted for communication with one or more other network nodes as well as processing circuitry 920, where the processing circuitry 920 is adapted to, for example, obtain multi-antenna configuration information or multi-antenna capability data, or both, for a second node in the wireless communications network, wherein the second node is one of a measuring node and a wireless device to be positioned, and to adapt a multi-antenna configuration of the wireless device for one or more transmissions to be measured for positioning purposes, or adapt a multi-antenna configuration of the measuring node for one or more positioning measurements, or both, based on the obtained multi-antenna configuration information or multi-antenna capability data, or both.

Processing circuit 920 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Because the various details and engineering tradeoffs associated with the design of baseband processing circuitry for wireless base stations and other wireless devices are well known and are unnecessary to a full understanding of the invention, additional details are not shown here.

Accordingly, in various embodiments of the invention, processing circuits, such as the processing circuits 920 of FIG. 9, are configured to carry out one or more of the techniques described above for assisting in uplink positioning of a target wireless device. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 10:
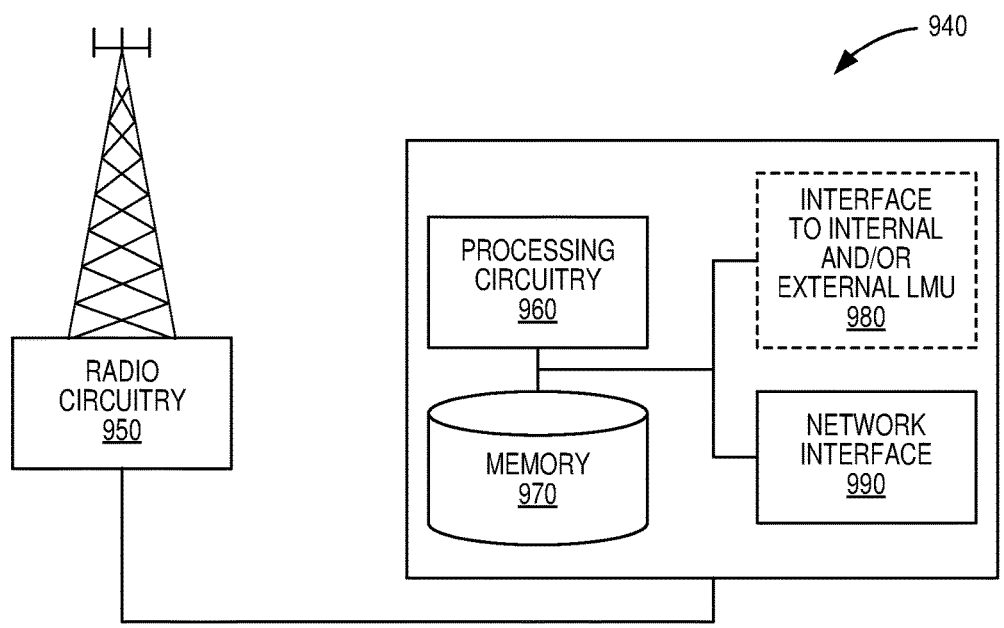
FIG. 10 illustrates an example radio network node according to several embodiments of the invention.

A variant of the network node 900 illustrated in FIG. 9 is shown in FIG. 10. Here, the illustrated network node is a radio network node 940. The example radio network node 940 shown in FIG. 10 includes processing circuitry 960, a memory 970, radio circuitry 950, and a network interface 990. The processing circuitry 960 may comprise additional radio-frequency circuitry and baseband processing circuitry (not shown). In particular embodiments, some or all of the functionality described above as being provided by a mobile base station, a base station controller, a relay node, a NodeB, an enhanced NodeB, an LMU, and/or any other type of mobile communications node may be provided by the processing circuitry 960 executing instructions stored on a computer-readable medium, such as the memory 970 shown in FIG. 10. Alternative embodiments of the network node 940 may include additional components responsible for providing additional functionality, including any of the functionality identified above and/or any functionality necessary to support the solution described above.

The radio network node 940 of FIG. 10 may be configured to operate as a base station according to Release 11 specifications for LTE, in some cases. In general, a base station communicates with access terminals and is referred to in various contexts as an access point, Node B, Evolved Node (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

In some cases, radio network node 940 includes an additional interface 980, adapted for communications with an internal or external LMU function, or both. This additional interface 980 may include circuitry and/or programmed logic that is additional to network interface 990, in some cases, or may comprise functionality added to the circuitry and/or programmed logic used to implement network interface 990. When configured as a base station, radio network node 940 may include an integrated LMU, or may share one or more components with an LMU, and/or may communicate with a standalone LMU via additional interface 980. In any of these cases, the processing circuitry 960 may be further configured to carry out the necessary communications between the base station functionality of radio network node 940 and the LMU functionality.

In other embodiments, radio network node 940 of FIG. 10 is configured to operate as an LMU or other radio signal measurement unit. In this case, radio network node 940 may include radio circuitry 950 that is adapted only for receiving and measuring uplink transmissions from UEs, in some cases. As noted earlier, an LMU may be integrated with an eNodeB, or share one or more components with an eNodeB, or may be standalone; in any of these cases, an LMU configured as shown in FIG. 10 is adapted to communicate with an eNodeB and/or a positioning node, e.g., using network interface 990.

Referring again to FIG. 10, it should be appreciated that radio circuitry 950 includes receiver circuits and/or transmitter circuits that use known radio processing and signal processing components and techniques, typically according to a particular telecommunications standard such as the 3GPP standard for LTE and/or LTE-Advanced. In some cases, radio network node may be a measurement node that includes only radio receiver circuitry, and not radio transmitter circuits. In either case, because the various details and engineering trade-offs associated with the design and implementation of such circuitry are well known and are unnecessary to a full understanding of the invention, additional details are not shown here.

Processing circuitry 960 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Again, because the various details and engineering tradeoffs associated with the design of processing circuitry for wireless base stations and other wireless devices are well known and are unnecessary to a full understanding of the invention, additional details are not shown here.

Accordingly, in various embodiments of the invention, processing circuits, such as the processing circuits 960 of FIG. 10, are configured to carry out one or more of the techniques described above for assisting in the positioning of a target wireless device. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module. It will be appreciated that the functions in several of the techniques and methods described above may be implemented using electronic data processing circuitry provided in a UE or similar wireless device. Each UE, of course, also includes suitable radio circuitry for receiving and transmitting radio signals formatted in accordance with known formats and protocols, e.g., LTE formats and protocols.

Figure 11:
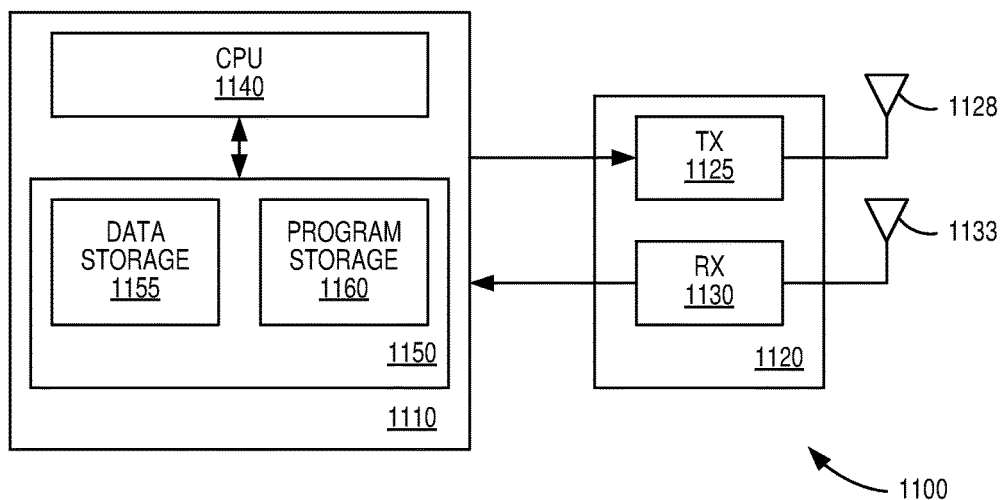
FIG. 11 illustrates an example wireless device according to several embodiments of the invention.

FIG. 11 illustrates features of an example UE 1100 according to several embodiments of the present invention. The illustrated UE may be adapted to carry out one or several of the techniques described above for enhancing UL measurements for positioning by adaptively using multi-antenna systems.

UE 1100 comprises a transceiver 1120 for communicating with one or more base station, as well as a processing circuit 1110 for processing the signals transmitted and received by the transceiver 1120. Transceiver 1120 includes a transmitter 1125 coupled to one or more transmit antennas 1128 and receiver 1130 coupled to one or more receive antennas 1133. The same antenna(s) 1128 and 1133 may be used for both transmission and reception. Receiver 1130 and transmitter 1125 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1110 comprises one or more processors 1140, hardware, firmware or a combination thereof, coupled to one or more memory devices 1150 that make up a data storage memory 1155 and a program storage memory 1160. Memory 1150 may comprise one or several types of memory such as read-only memory (ROM), random-access memory, cache memory, flash memory devices, optical storage devices, etc. Again, because the various details and engineering tradeoffs associated with the design of baseband processing circuitry for UEs and similar wireless devices are well known and are unnecessary to a full understanding of the invention, additional details are not shown here.

Typical functions of the processing circuit 1110 include modulation and coding of transmitted signals and the demodulation and decoding of received signals. In several embodiments of the present invention, processing circuit 1110 is adapted, using suitable program code stored in program storage memory 1160, for example, to carry out one or several of the techniques described above. Of course, it will be appreciated that not all of the steps of these techniques are necessarily performed in a single microprocessor or even in a single module.

Several advantages may be achieved using the various techniques and apparatus described above. Some of the advantages that can be envisioned with several embodiments of the described techniques and apparatus are as follows:

Possibility for obtaining and exploiting multi-antenna configuration in positioning nodes and other nodes involved in the positioning of wireless devices, resulting in improved positioning performance Ensuring aligned transmitter and receiver configuration of the transmitting and measuring node, respectively, to avoid measurement failure or positioning failure Possibility of adapting multi-antenna configuration for positioning with the purpose of interference coordination It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a first node in a wireless communications network, for assisting positioning measurements, wherein the method comprises:

obtaining a multi-antenna configuration information or a multi-antenna capability data, or both, for a second node in the wireless communications network; and adapting, by the first node, a multi-antenna configuration of the first node for one or more transmissions to be measured for positioning purposes based on the obtained multi-antenna configuration information or multi-antenna capability data, or both, wherein adapting the multi-antenna configuration of the wireless device comprises selecting at least one of a multi-antenna technique and a transmit antenna configuration, at a measuring node, and measuring the one or more transmissions for positioning purposes using the selected at least one of a multi-antenna technique and a transmit antenna configuration.

2. The method of claim 1, wherein the multi-antenna capability data indicates at least one of: a capability of using a particular multi-antenna configuration; a capability of dynamically activating or deactivating one or more antennas; a capability of determining a multi-antenna configuration; and a capability of adapting the multi-antenna configuration.

3. The method of claim 1, further comprising performing at least one radio signal transmission or at least one radio measurement, based on the adapted multi-antenna configuration.

4. The method of claim 1, wherein adapting the multi-antenna configuration comprises adapting the transmit antenna configuration by adapting at least one of:

a transmit antenna type;
an antenna pattern;
a number of transmit antennas or transmit antenna ports;
a set of transmit antennas to be used;
an antenna spacing;
an antenna polarization;
one or more antenna orientation parameters;
a transmitter beam configuration;
a transmission power or power weights associated with transmit antennas, transmit antenna elements, or multi-antenna branches or streams;
a number of streams transmitted by multiple antennas;
a reference signal specific to multi-antenna transmission; and
information specifying a carrier, a number of carriers, a frequency band, or a system combination, or a combination thereof, for the multi-antenna transmission.

5. The method of claim 4, wherein adapting the transmit antenna configuration comprises adapting at least one of:
- a maximum absolute power or a maximum relative transmit power allowed per transmit antenna, an antenna element, or a branch;
- a transmit power back for a multi-antenna transmitter or a multi-antenna scheme; and
- a transport form of a multi-antenna signal.

6. The method of claim 1, wherein adapting the multi-antenna configuration comprises adapting the transmit antenna configuration based on at least one of:
- a transmit antenna type;
- an antenna pattern;
- a number of transmit antennas or transmit antenna ports;
- a set of transmit antennas to be used;
- an antenna spacing;
- an antenna polarization;
- one or more antenna orientation parameters;
- a transmitter beam configuration;
- a transmission power or power weights associated with transmit antennas, transmit antenna elements, or multi-antenna branches or streams;
- a number of streams transmitted by multiple antennas;
- a reference signal specific to multi-antenna transmission; and
- information specifying a carrier, a number of carriers, a frequency band, or a system combination, or a combination thereof, for the multi-antenna transmission.

7. The method of claim 1, wherein adapting the multi-antenna configuration comprises adapting a receive antenna configuration by adapting at least one of:
- a receive antenna type;
- a receiver type for receiving a multi-antenna transmission;
- an antenna pattern;
- a number of receive antennas, receive antenna ports, branches, or streams;
- a set of receive antennas to be used for receiving transmissions to be measured;
- a receive antenna spacing;
- a receive antenna polarization;
- one or more receive antenna orientation parameters;
- a receiver beam configuration;
- weights associated with receive antennas, receive antenna elements, branches, or streams;
- a number of transmitted streams to be received; and
- information specifying a carrier, a number of carriers, a frequency band, or a system combination, or a combination thereof, for the multi-antenna transmission.

8. The method of claim 7, wherein adapting the receive antenna configuration comprises selecting a transport format for a multi-antenna signal to be received.

9. The method of claim 1, wherein adapting the multi-antenna configuration comprises adapting a receive antenna configuration based on at least one of:
- a receive antenna type;
- a receiver type for receiving a multi-antenna transmission;
- an antenna pattern;
- a number of receive antennas, receive antenna ports, branches, or streams;
- a set of receive antennas to be used for receiving transmissions to be measured;
- a receive antenna spacing;
- a receive antenna polarization;
- one or more receive antenna orientation parameters;
- a receiver beam configuration;
- weights associated with receive antennas, receive antenna elements, branches, or streams;
- a number of transmitted streams to be received; and
- information specifying a carrier, a number of carriers, a frequency band, or a system combination, or a combination thereof, for the multi-antenna transmission.

10. The method of claim 1, wherein obtaining the multi-antenna capability data comprises receiving data describing the capabilities from another node in the wireless communications network.

11. The method of claim 1, wherein the adapting is performed by the first node based on a pre-defined rule, autonomously, or based on a request, indication or instruction received from another node.

12. The method of claim 1, wherein the adapting is further based on one or more of:
- interference conditions;
- bandwidth configurations or transmit signal configurations;
- feedback availability;
- measurement performance;
- UE speed;
- environment type;
- a type or types of signals used for positioning measurements;
- whether carrier aggregation is used by the wireless device;
- multi-antenna related capability of another node, and
- a duplex mode configuration for the wireless device or a measuring node.

13. A first node in a wireless communication system, the first node comprising a network interface circuit adapted for communication with one or more other nodes in the wireless communication system and a processing circuit, wherein the processing circuit is adapted to:
- obtain a multi-antenna configuration information or a multi-antenna capability data, or both, for a second node in the wireless communications network; and
- adapt a multi-antenna configuration of the first node for one or more transmissions to be measured for positioning purposes based on the obtained multi-antenna configuration information or multi-antenna capability data, or both, wherein the processing circuit is adapted to the multi-antenna configuration of the wireless device by selecting at least one of a multi-antenna technique and a transmit antenna configuration, at a measuring node, and measuring the one or more transmissions for positioning purposes using the selected at least one of a multi-antenna technique and a transmit antenna configuration.

* * * * *